United States Patent
Sarkis et al.

(10) Patent No.: US 12,089,183 B2
(45) Date of Patent: Sep. 10, 2024

(54) INITIALIZING SEQUENCE GENERATORS TO FACILITATE SIDELINK COMMUNICATIONS

(71) Applicant: QUALCOMM Incorporated, San Diego, CA (US)

(72) Inventors: Gabi Sarkis, San Diego, CA (US); Kapil Gulati, Belle Mead, NJ (US); Tien Viet Nguyen, Bridgewater, NJ (US); Shuanshuan Wu, San Diego, CA (US); Sudhir Kumar Baghel, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/951,734

(22) Filed: Nov. 18, 2020

(65) Prior Publication Data

US 2021/0153168 A1    May 20, 2021

Related U.S. Application Data

(60) Provisional application No. 62/937,745, filed on Nov. 19, 2019.

(51) Int. Cl.
| | |
|---|---|
| *H04W 72/02* | (2009.01) |
| *H04B 7/06* | (2006.01) |
| *H04L 1/00* | (2006.01) |
| *H04L 5/00* | (2006.01) |
| *H04W 72/04* | (2023.01) |
| *H04W 72/044* | (2023.01) |
| *H04W 72/20* | (2023.01) |
| *H04W 72/53* | (2023.01) |

(52) U.S. Cl.
CPC .......... *H04W 72/02* (2013.01); *H04B 7/0626* (2013.01); *H04L 1/0061* (2013.01); *H04L 5/0051* (2013.01); *H04W 72/0466* (2013.01); *H04W 72/20* (2023.01); *H04W 72/53* (2023.01)

(58) Field of Classification Search
None
See application file for complete search history.

(56) References Cited

U.S. PATENT DOCUMENTS

2019/0268904 A1    8/2019    Miao et al.

FOREIGN PATENT DOCUMENTS

| CN | 110447188 A | 11/2019 | |
|---|---|---|---|
| EP | 4040697 A1 * | 8/2022 | ........... H04L 1/1812 |

OTHER PUBLICATIONS

3GPP TSG RAN WG1, Discussion on physical layer structure for NR sidelink, Nov. 18-22, 2019_R1-1913235 (Year: 2019).*

(Continued)

*Primary Examiner* — Yemane Mesfin
*Assistant Examiner* — Jeff Banthrongsack
(74) *Attorney, Agent, or Firm* — Loza & Loza, LLP

(57) ABSTRACT

Aspects directed towards initializing sequence generators to facilitate sidelink communications are disclosed. In one example, a type associated with a sidelink communication is determined. A sequence generator is then initialized with a seed in which the seed is based on the type associated with the sidelink communication. The sequence generator is then utilized to facilitate transmitting at least a portion of the sidelink communication.

27 Claims, 12 Drawing Sheets

(56) References Cited

OTHER PUBLICATIONS

3GPP TSG RAN WG1, on NR V2X Physical Layer Structure, Nov. 18-22, 2019_R1-1912810 (Year: 2019).*
Apple: "On NR V2X Physical Layer Structure", 3GPP TSG RAN WG1 #99, 3GPP Draft; R1-1912810, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 18 2019-Nov. 22, 2019, Nov. 9, 2019 (Nov. 9, 2019), pp. 1-15, XP051823610, Retrieved from the Internet: URL: https://ftp.3gpp.org/tsg_ran/WG1_RL1/TSGR1_99/Docs/R1-1912810. zip R1-1912810 on NR V2X Physical Layer Structure.docx [retrieved on Nov. 9, 2019] Sections 2.1-2.6.
Ericsson: "PHY Layer Structure for NR Sidelink", 3GPP TSG RAN WG1 #99, 3GPP Draft; R1-1912597, 3rd Generation Partnership Project (3GPP), Mobile Competence Centre; 650, Route Des Lucioles; F-06921 Sophia-Antipolis Cedex; France, vol. RAN WG1, No. Reno, NV, US; Nov. 18, 2019-Nov. 22, 2019, Nov. 8, 2019 (Nov. 8, 2019), 32 Pages, XP051820108.
International Search Report and Written Opinion—PCT/US2020/061266—ISA/EPO—Mar. 9, 2021.
LG Electronics: "Discussion on Physical Layer Structure for NR Sidelink", 3GPP TSG RAN WG1 #99, 3GPPDraft, R1-1913235, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 13, 2019 (Nov. 13, 2019), 36 Pages, XP051824915.

* cited by examiner

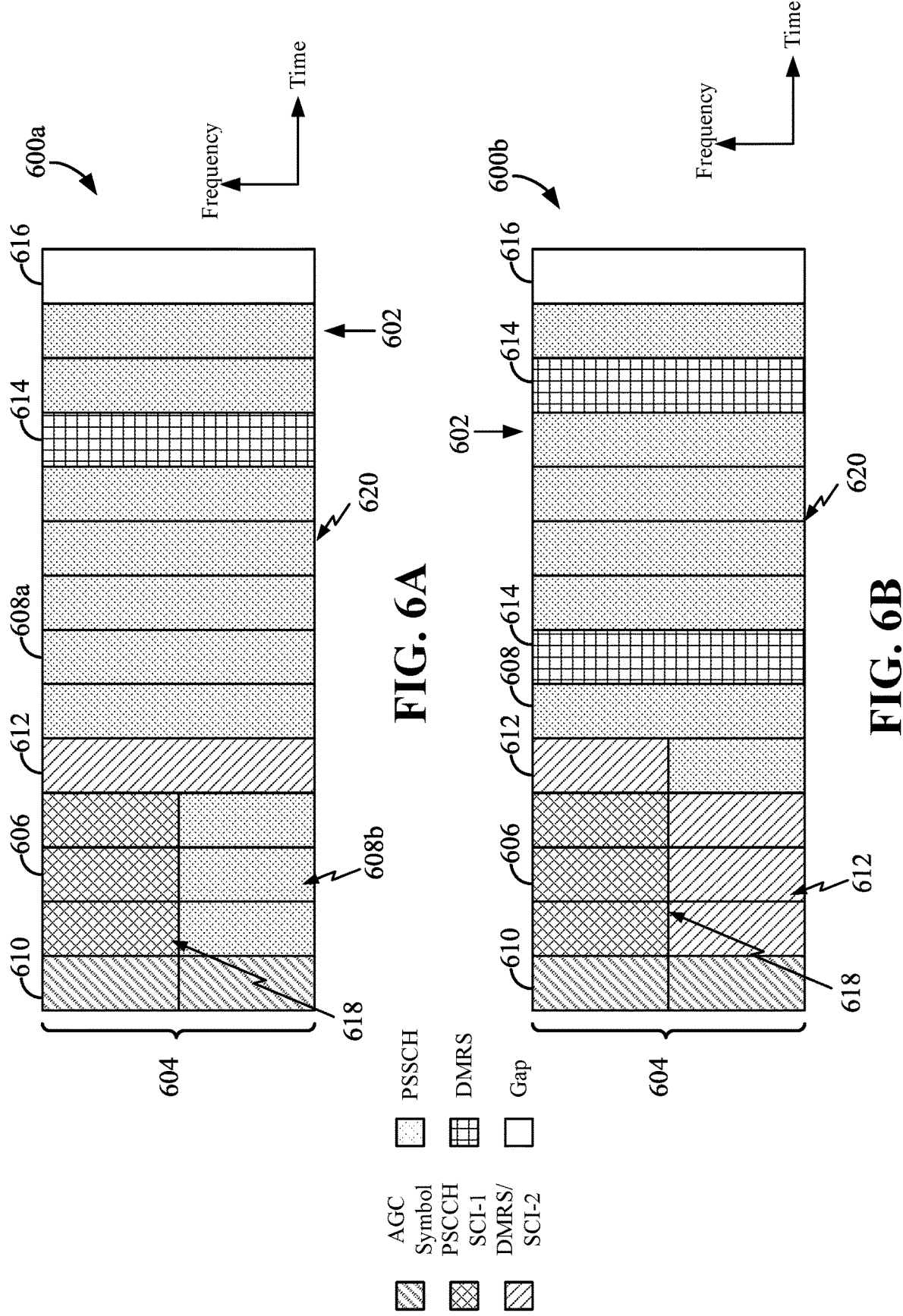

INITIALIZING SEQUENCE GENERATORS TO FACILITATE SIDELINK COMMUNICATIONS

PRIORITY CLAIM

This application claims priority to and the benefit of provisional patent application No. 62/937,745 filed in the United States Patent & Trademark Office on Nov. 19, 2019, the entire content of which is incorporated herein by reference as if fully set forth below in its entirety and for all applicable purposes.

TECHNICAL FIELD

The technology discussed below generally relates to wireless communication systems, and more particularly, to initializing sequence generators to facilitate sidelink communications.

INTRODUCTION

Sidelink communications were initially introduced as a Long Term Evolution (LTE) feature to enable device-to-device (D2D) communications within legacy cellular-based LTE radio access networks. For comparison, in a legacy uplink/downlink, a user equipment (UE) may communicate with another UE through the Uu interface and data traverses the LTE eNode B (eNB). A sidelink, however, enables the direct communication between proximal UEs using the newly defined PC5 interface so that data does not need to go through the eNB.

Sidelink communications will continue to be supported by 5G New Radio (NR) networks. Sequence generators are commonly used to encode sidelink communications, wherein initializing such sequence generators presents unique challenges.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method of wireless communication by a user equipment (UE) is disclosed. The method includes determining a type associated with a sidelink communication, initializing a sequence generator with a seed, wherein the seed is based on the type associated with the sidelink communication, and utilizing the sequence generator to facilitate transmitting at least a portion of the sidelink communication.

In another example, a UE for wireless communication is disclosed. The UE includes at least one processor, a transceiver communicatively coupled to the at least one processor, and a memory communicatively coupled to the at least one processor. The at least one processor may be configured to determine a type associated with a sidelink communication, initialize a sequence generator with a seed, wherein the seed is based on the type associated with the sidelink communication, and utilize the sequence generator to facilitate transmitting at least a portion of the sidelink communication.

In another example, a non-transitory processor-readable storage medium having instructions for UE thereon may be disclosed. The instructions, when executed by a processing circuit, cause the processing circuit to determine a type associated with a sidelink communication, initialize a sequence generator with a seed, wherein the seed is based on the type associated with the sidelink communication, and utilize the sequence generator to facilitate transmitting at least a portion of the sidelink communication.

In a further example, a UE for wireless communication may be disclosed. The UE includes means for determining a type associated with a sidelink communication, means for initializing a sequence generator with a seed, wherein the seed is based on the type associated with the sidelink communication, and means for utilizing the sequence generator to facilitate transmitting at least a portion of the sidelink communication.

These and other aspects of the invention will become more fully understood upon a review of the detailed description, which follows. Other aspects, features, and examples of the present invention will become apparent to those of ordinary skill in the art, upon reviewing the following description of specific, exemplary examples of the present invention in conjunction with the accompanying figures. While features of the present invention may be discussed relative to certain examples and figures below, all examples of the present invention can include one or more of the advantageous features discussed herein. In other words, while one or more examples may be discussed as having certain advantageous features, one or more of such features may also be used in accordance with the various examples of the invention discussed herein. In similar fashion, while exemplary examples may be discussed below as device, system, or method examples it should be understood that such exemplary examples can be implemented in various devices, systems, and methods.

BRIEF DESCRIPTION OF THE DRAWINGS

FIGS. 6A-6C illustrate examples of sidelink slot structures according to some aspects.

DETAILED DESCRIPTION

Figure 1:
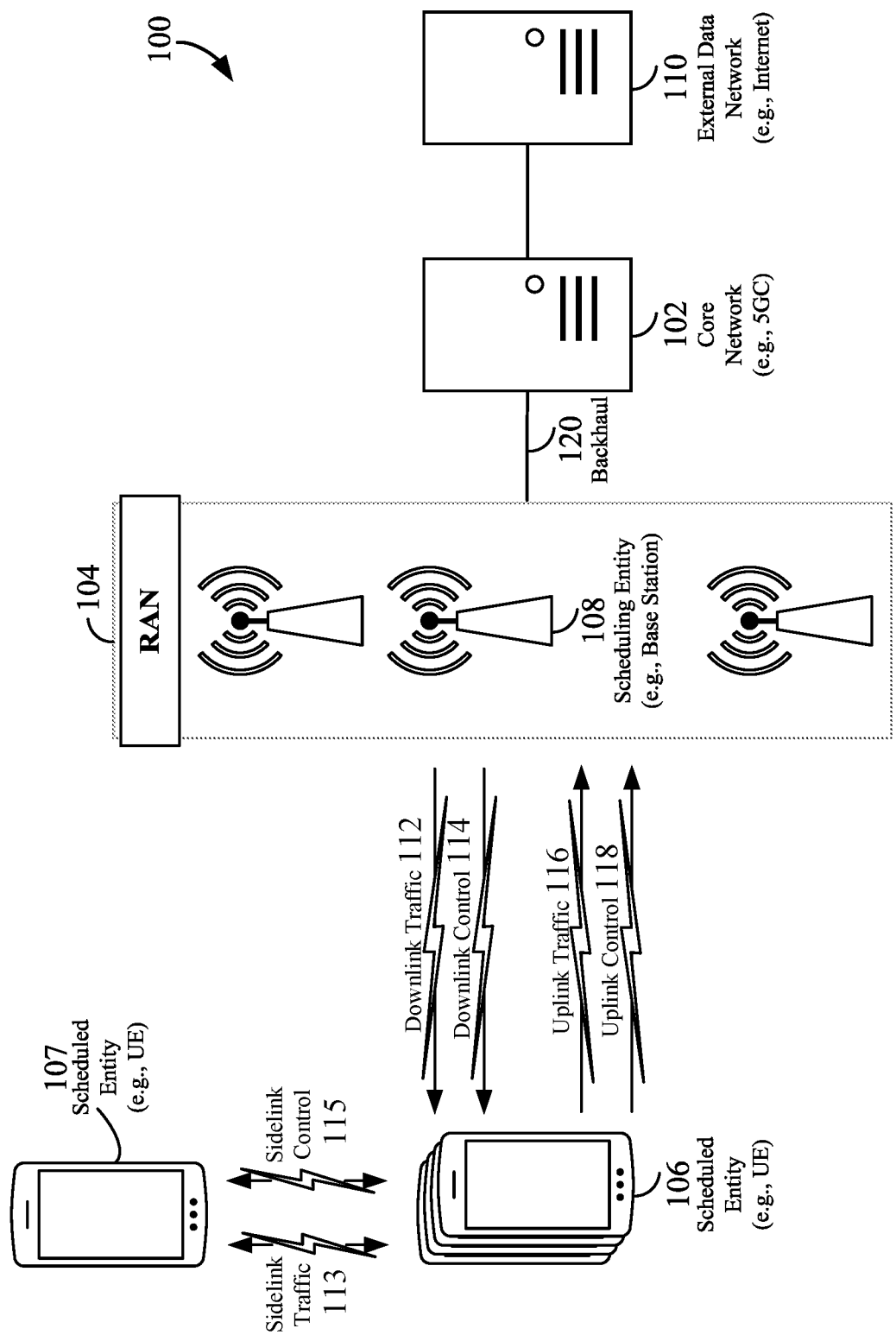
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, examples and/or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Various aspects disclosed herein are directed towards initializing sequence generators to facilitate sidelink communications. A sequence generators may be used to encode various types of communications including communications between a user equipment (UE) and a base station as well as sidelink communications between UEs. Initializing a sequence generator for sidelink communications may present unique challenges.

Accordingly, various aspects disclosed herein are directed towards initializing sequence generators to facilitate various types of sidelink communications. For instance, aspects disclosed herein include aspects directed towards initializing sequence generators for scrambling coded bits, and/or initializing sequence generators used for various reference signals. In one example, the UE may determine a type associated with a sidelink communication, and may subsequently initialize a sequence generator with a seed in which the seed is based on the type associated with the sidelink communication. The UE may then utilize the sequence generator to facilitate transmitting at least a portion of the sidelink communication.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
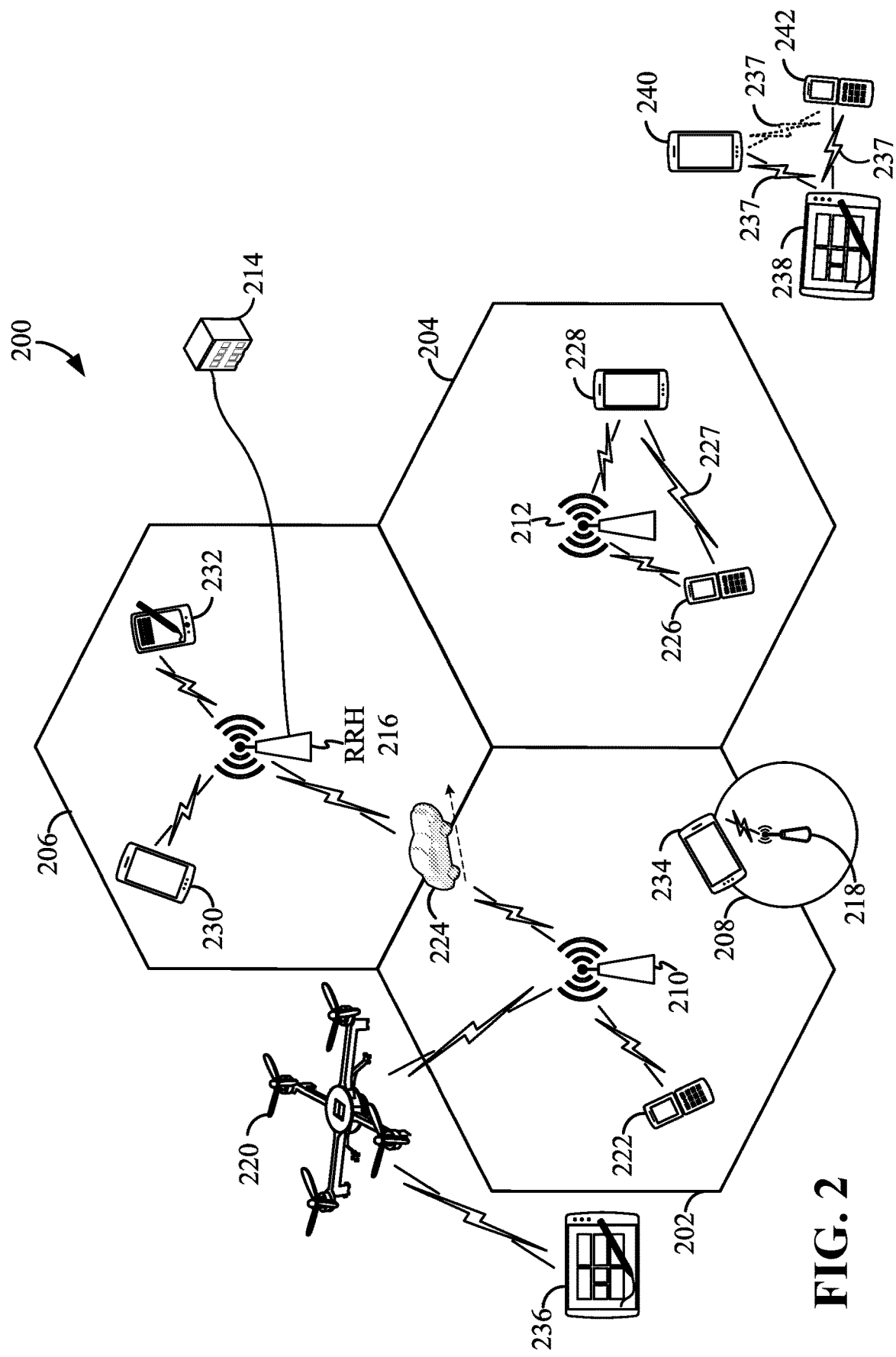
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

In a further aspect of the RAN 200, sidelink signals may be used between UEs without necessarily relying on scheduling or control information from a base station. For example, two or more UEs (e.g., UEs 238, 240, and 242) may communicate with each other using peer to peer (P2P) or sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication. In either case, such sidelink signaling 227 and 237 may be implemented in a P2P network, a device-to-device (D2D) network, vehicle-to-vehicle (V2V) network, a vehicle-to-everything (V2X), a mesh network, or other suitable direct link network.

Two primary technologies that may be used by V2X networks include dedicated short range communication (DSRC) based on IEEE 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink networks other than V2X networks.

In some examples, referring again to FIG. 1, scheduled entities such as a first scheduled entity 106 and a second scheduled entity 107 may utilize sidelink signals for direct D2D communication (e.g., a V2X communication). Sidelink signals may include sidelink traffic 113 and sidelink control 115. In some examples, the sidelink control 115 may include synchronization information to synchronize communication on the sidelink channel. In addition, the sidelink control 115 may include scheduling information indicating one or more resource blocks reserved by the transmitting sidelink device to transmit the sidelink traffic 113 to the receiving sidelink device. In some examples, the scheduling information may further include information related to the traffic 113, such as a modulation and coding scheme utilized for the traffic 113. In some examples, the sidelink control 115 may be transmitted within a physical sidelink control channel (PSCCH), while the sidelink data 130 may be transmitted within a physical sidelink shared channel (PSSCH).

In certain aspects, a scheduled entity 106 that is out-of-coverage (OOC) of a base station and has lost synchronization with a synchronization source on which a V2X communication is based, may maintain the V2X communication based on packet timing information received from other synchronized devices (e.g., scheduled entity 107). The timing for the V2X communication may further be based on parameter values from a higher layer of the respective other synchronized devices. By way of example, the scheduled entity 106 may receive a proximity service (ProSe) PC5 transmission from two or more peer UEs including a first scheduled entity and a second scheduled entity. If the first scheduled entity has low propagation delay and a high time confidence as seen by the scheduled entity 106, a timing estimate based on the first scheduled entity may be better (i.e. closer to satellite timing) than a timing estimate based on the timing of the second scheduled entity, which may have high propagation delay and low time confidence. Higher layer metrics, such as a time confidence parameter, positional uncertainty parameter, or others can be obtained from a higher layer message. One example of a higher layer message that includes this information is a basic safety message which may be required by certain communication standards. In some cases, a basic safety message is transmitted periodically, such as every 100 milliseconds. Based on the higher layer parameters, the scheduled entity 106 can determine how much priority (i.e., trust or weight) to give to packets from particular scheduled entities. Although some devices may have a better timing estimate, those with smaller estimates can still help improve the accuracy of a calculated timing as the calculated timing may be statistically improved by using timing estimates from a larger number of peer devices. In some cases a weight of zero may be applied to effectively remove an estimate for a specific peer device from the computed timing adjustment. In other cases, a non-zero weight for a first scheduled entity may be assigned that is less than a non-zero weight of a second scheduled entity. Further discussion of generating weights for a specific scheduled entity and for calculating a weighted timing adjustment is provided below.

Figure 3:
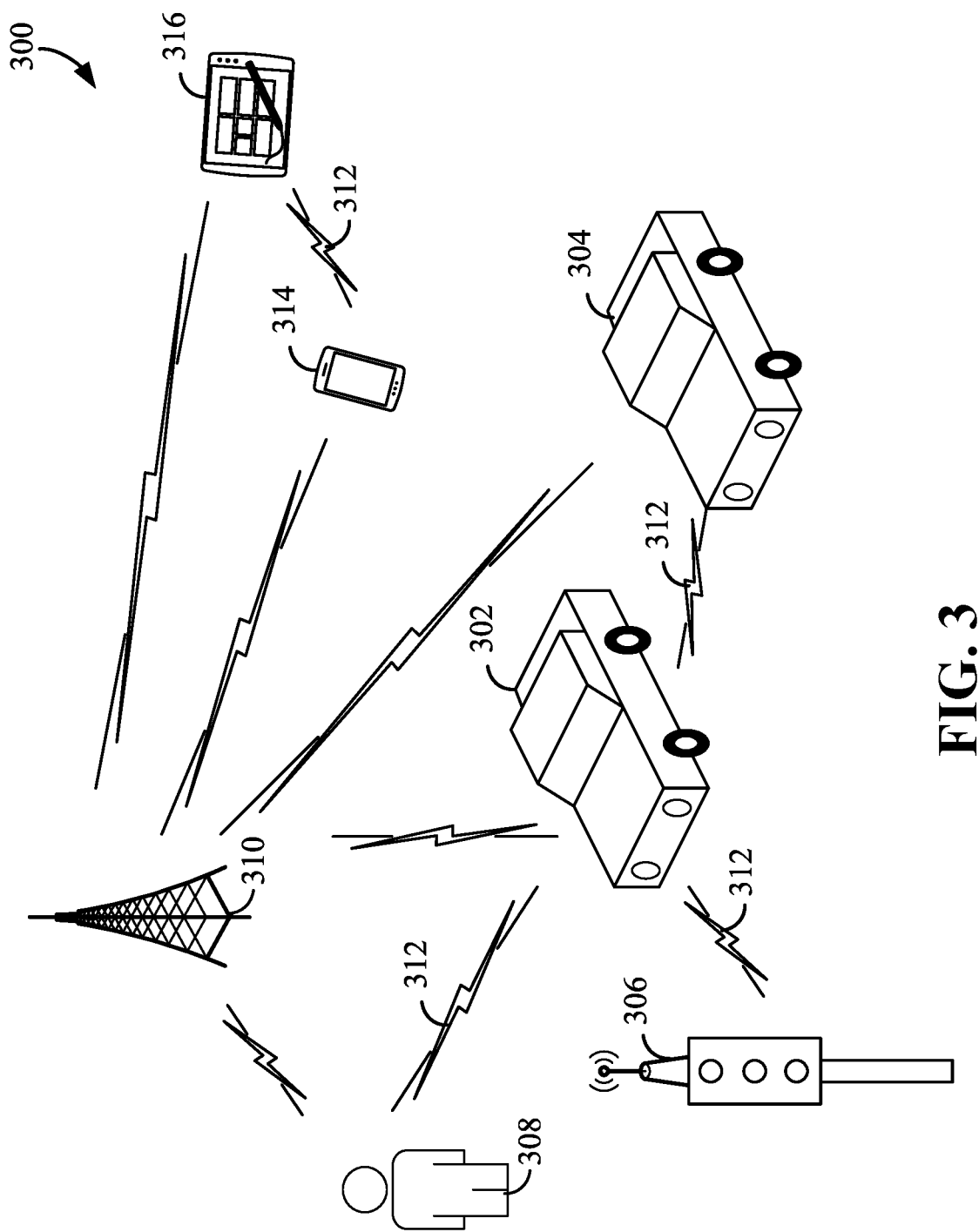
FIG. 3 is a diagram illustrating an example of a wireless communication network employing sidelink communication according to some aspects.

FIG. 3 illustrates an example of a wireless communication network 300 configured to support D2D or sidelink communication. In some examples, sidelink communication may include V2X communication. V2X communication involves the wireless exchange of information directly between not only vehicles (e.g., vehicles 302 and 304) themselves, but also directly between vehicles 302/304 and infrastructure (e.g., roadside units (RSUs) 306), such as streetlights, buildings, traffic cameras, tollbooths or other stationary objects, vehicles 302/304 and pedestrians 308, and vehicles 302/304 and wireless communication networks (e.g., base station 310). In some examples, V2X communication may be implemented in accordance with the New Radio (NR) cellular V2X standard defined by 3GPP, Release 16, or other suitable standard.

V2X communication enables vehicles 302 and 304 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data may be utilized by a V2X connected vehicle 302 and 304 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist 308 may be utilized to trigger a warning sound, vibration, flashing light, etc., in case of imminent danger.

The sidelink communication between vehicle-UEs (V-UEs) 302 and 304 or between a V-UE 302 or 304 and either an RSU 306 or a pedestrian-UE (P-UE) 308 occurs over a proximity service (ProSe) PC5 interface 312. In various aspects of the disclosure, the PC5 interface 312 may further be utilized to support D2D communication in other proximity use cases. Examples of other proximity use cases may include public safety or commercial (e.g., entertainment, education, office, medical, and/or interactive) based proximity services. In the example shown in FIG. 3, ProSe communication may further occur between UEs 314 and 316.

ProSe communication may support different operational scenarios, such as in-coverage, out-of-coverage, and partial coverage. Out-of-coverage refers to a scenario in which UEs (e.g., V-UEs 302 and 304 and P-UE 308) are outside of the coverage area of a base station (e.g., base station 310), but each are still configured for ProSe communication. Partial coverage refers to a scenario in which some of the UEs (e.g., V-UE 304) are outside of the coverage area of the base station 310, while other UEs (e.g., V-UE 302 and P-UE 308) are in communication with the base station 310. In-coverage refers to a scenario in which UEs (e.g., UEs 314 and 316) are in communication with the base station 310 (e.g., gNB) via a Uu (e.g., cellular interface) connection to receive ProSe service authorization and provisioning information to support ProSe operations.

Figure 4:
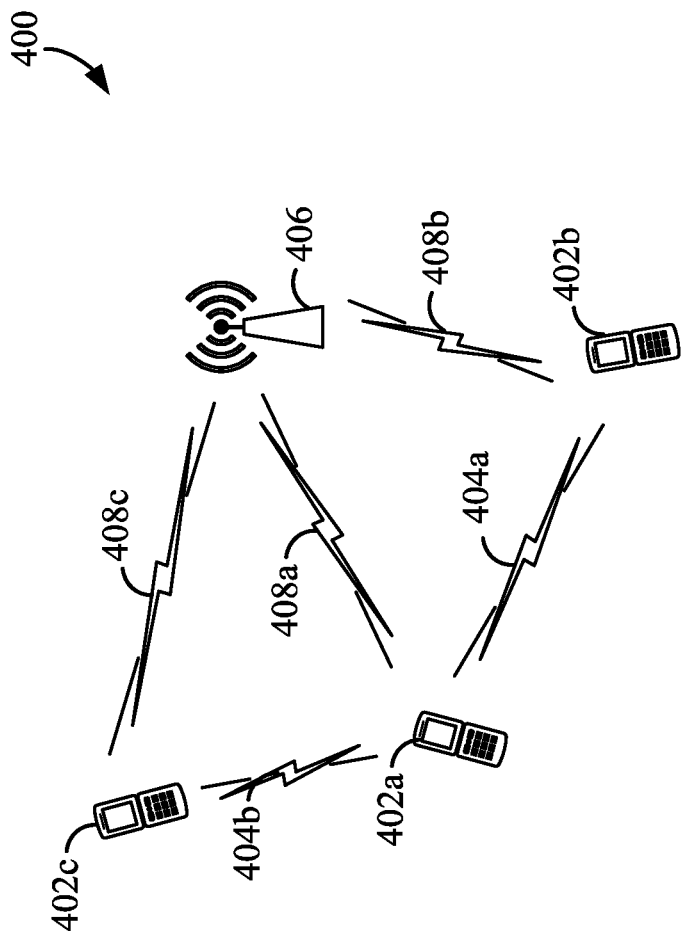
FIG. 4 is a diagram illustrating an example of a wireless communication system for facilitating both cellular and sidelink communication according to some aspects.

FIG. 4 is a diagram illustrating an example of a wireless communication system 400 for facilitating both cellular and sidelink communication. The wireless communication system 400 includes a plurality of UEs 402a, 402b, and 402c and a base station (e.g., eNB or gNB) 406. In some examples, the UEs 402a, 402b, and 402c may be UEs capable of implementing D2D or V2X devices (e.g., RSUs, V-UEs, P-UEs, etc.) within a V2X network.

The UEs 402a and 402b may communicate over a first PC5 interface 404a, while UEs 402a and 402c may communicate over a second PC5 interface 404b. UEs 402a, 402b, and 402c may further communicate with the base station 406 over respective Uu interfaces 408a, 408b, and 408c. The sidelink communication over the PC5 interfaces 404a and 404b may be carried, for example, in a licensed frequency domain using radio resources operating according to a 5G NR or NR sidelink (SL) specification and/or in an unlicensed frequency domain, using radio resources operating according to 5G new radio-unlicensed (NR-U) specifications.

In some examples, a common carrier may be shared between the PC5 interfaces 404a and 404b and Uu interfaces 408a-408c, such that resources on the common carrier may be allocated for both sidelink communication between UEs 402a-402c and cellular communication (e.g., uplink and downlink communication) between the UEs 402a-402c and the base station 406. For example, the wireless communication system 400 may be configured to support a V2X network in which resources for both sidelink and cellular communication are scheduled by the base station 406. In other examples, the UEs 402a-402c may autonomously select sidelink resources (e.g., from one or more frequency bands or sub-bands designated for sidelink communication) for communication therebetween. In this example, the UEs 402a-402c may function as both scheduling entities and scheduled entities scheduling sidelink resources for communication with each other.

Figure 5:
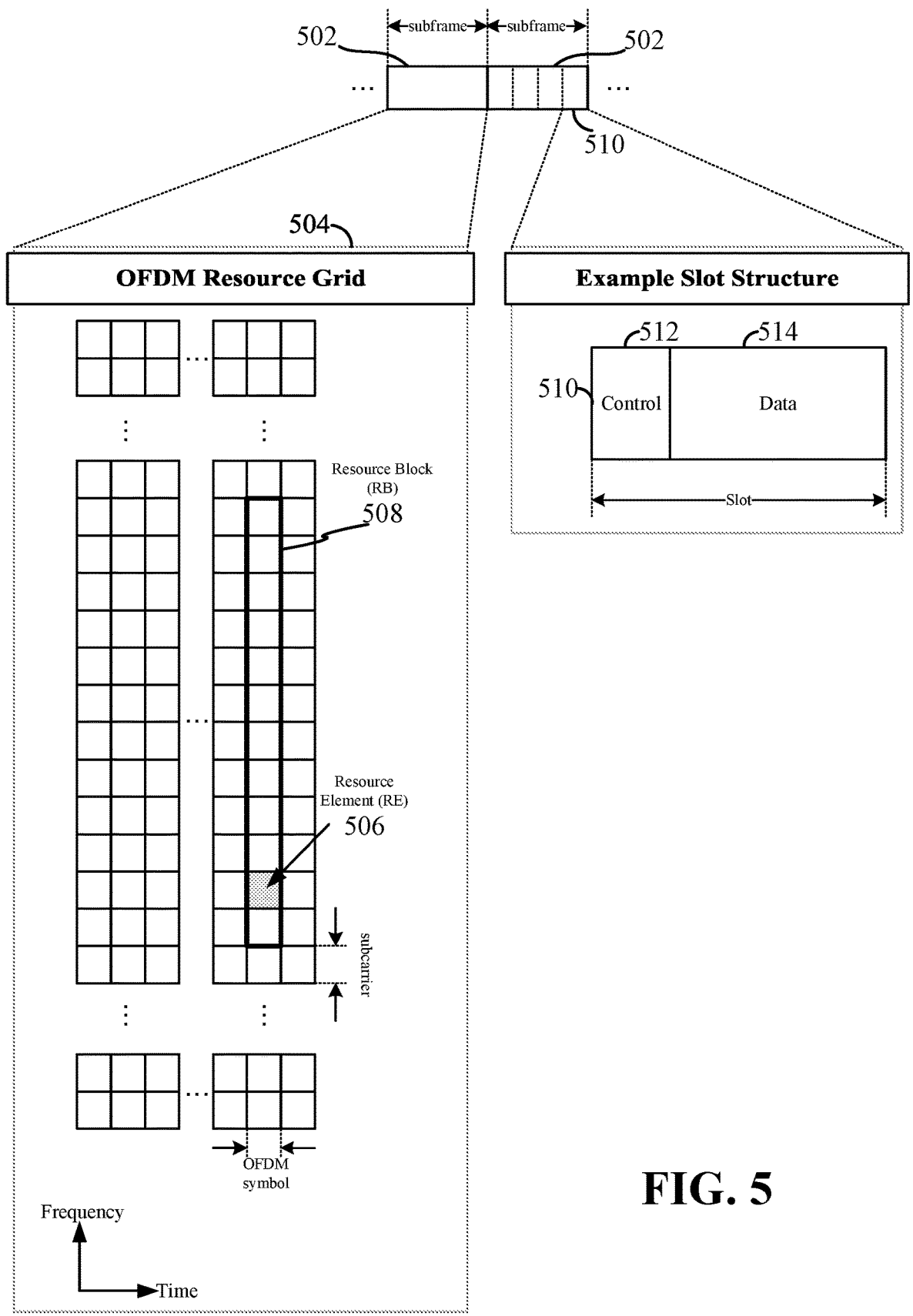
FIG. 5 is a schematic illustration of an organization of wireless resources in an air interface utilizing orthogonal frequency divisional multiplexing (OFDM) according to some aspects.

Referring now to FIG. 5, an expanded view of an exemplary subframe 502 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 504 may be used to schematically represent time-frequency resources for a given antenna port. That is, in a multiple-input-multiple-output (MIMO) implementation with multiple antenna ports available, a corresponding multiple number of resource grids 504 may be available for communication. The resource grid 504 is divided into multiple resource elements (REs) 506. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 508, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 508 entirely corresponds to a single direction of communication (either transmission or reception for a given device).

Scheduling of UEs or sidelink devices (hereinafter collectively referred to as UEs) for downlink, uplink, or sidelink transmissions typically involves scheduling one or more resource elements 506 within one or more sub-bands. Thus, a UE generally utilizes only a subset of the resource grid 504. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In this illustration, the RB 508 is shown as occupying less than the entire bandwidth of the subframe 502, with some subcarriers illustrated above and below the RB 508. In a given implementation, the subframe 502 may have a bandwidth corresponding to any number of one or more RBs 508. Further, in this illustration, the RB 508 is shown as occupying less than the entire duration of the subframe 502, although this is merely one possible example.

Each 1 ms subframe 502 may consist of one or multiple adjacent slots. In the example shown in FIG. 5, one subframe 502 includes four slots 510, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 510 illustrates the slot 510 including a control region 512 and a data region 514. In general, the control region 512 may carry control channels, and the data region 514 may carry data channels. Of course, a slot may contain all DL, all UL, or at least one DL portion and at least one UL portion. The simple structure illustrated in FIG. 5 is merely exemplary in nature, and different slot structures may be utilized, and may include one or more of each of the control region(s) and data region(s).

Although not illustrated in FIG. 5, the various REs 506 within a RB 508 may be scheduled to carry one or more physical channels, including control channels, shared channels, data channels, etc. Other REs 506 within the RB 508 may also carry pilots or reference signals. These pilots or reference signals may provide for a receiving device to perform channel estimation of the corresponding channel, which may enable coherent demodulation/detection of the control and/or data channels within the RB 508.

In some examples, the slot 510 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 506 (e.g., within the control region 512) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 506 (e.g., in the control region 512 or the data region 514) to carry other DL signals, such as a demodulation reference signal (DMRS); a phase-tracking reference signal (PT-RS); a channel state information (CSI) reference signal (CSI-RS); a primary synchronization signal (PSS); and a secondary synchronization signal (SSS). A UE may utilize the PSS and SSS to achieve radio frame, subframe, slot, and symbol synchronization in the time domain, identify the center of the channel (system) bandwidth in the frequency domain, and identify the physical cell identity (PCI) of the cell. The synchronization signals PSS and SSS, and in some examples, the PBCH and a PBCH DMRS, may be transmitted in a synchronization signal block (SSB). The PBCH may further include a master information block (MIB) that includes various system information, along with parameters for decoding a system information block (SIB). The SIB may be, for example, a SystemInformationType 1 (SIB1) that may include various additional system information. Examples of system information transmitted in the MIB may include, but are not limited to, a subcarrier spacing, system frame number, a configuration of a PDCCH control resource set (CORESET) (e.g., PDCCH CORESET0), and a search space for SIB1. Examples of additional system information transmitted in the SIB1 may include, but are not limited to, a random access search space, downlink configuration information, and uplink configuration information. The MIB and SIB1 together provide the minimum system information (SI) for initial access.

In an UL transmission, the scheduled entity (e.g., UE) may utilize one or more REs 506 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 506 (e.g., within the data region 514) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 506 within the data region 514 may be configured to carry other signals, such as one or more SIBs and DMRSs.

In an example of sidelink communication over a sidelink carrier via a PC5 interface, the control region 512 of the slot 510 may include a physical sidelink control channel (PSCCH) including sidelink control information (SCI) transmitted by an initiating (transmitting) sidelink device (e.g., V2X or other sidelink device) towards a set of one or more other receiving sidelink devices. The data region 514 of the slot 510 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 506 within slot 510. For example, HARQ feedback information may be transmitted in a physical sidelink feedback channel (PSFCH) within the slot 510 from the receiving sidelink device to the transmitting sidelink device. In addition, one or more reference signals, such as a sidelink SSB and/or a sidelink CSI-RS, may be transmitted within the slot 510.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 5 are not necessarily all of the channels or carriers that may be utilized between devices, and those of ordinary skill in the art will recognize that other channels or carriers may be utilized in addition to those illustrated, such as other traffic, control, and feedback channels.

In 5G NR (e.g., V2X), sidelink communication may utilize transmission or reception resource pools. For example, the minimum resource allocation unit in frequency may be a sub-channel (e.g., which may include, for example, 10, 15, 20, 25, 50, 75, or 100 consecutive RBs) and the minimum resource allocation unit in time may be one slot. A radio resource control (RRC) configuration of the resource pools may be either pre-configured (e.g., pre-loaded on the UE) or configured by the base station (e.g., gNB).

In addition, there may be two main resource allocation modes of operation for sidelink (e.g., PC5) communications. In a first mode, Mode 1, a radio access network (RAN) node (e.g., gNB) may allocate resources to UEs for sidelink communication between the UEs in various manners. For example, the RAN node may allocate sidelink resources dynamically (e.g., a dynamic grant) to UEs, in response to requests for sidelink resources from the UEs. The RAN node may further activate preconfigured sidelink grants (e.g., configured grants) for sidelink communication among the UEs. In Mode 1, sidelink feedback may be reported back to the RAN node by a transmitting UE.

In a second mode, Mode 2, the UEs may autonomously select sidelink resources for sidelink communication therebetween. In some examples, a transmitting UE may perform resource/channel sensing to select resources (e.g., sub-channels) on the sidelink channel that are unoccupied. Signaling on the sidelink is the same between the two modes. Therefore, from a receiver's point of view, there is no difference between the modes.

In some examples, sidelink (e.g., PC5) communication may be scheduled by use of sidelink control information (SCI). SCI may include two SCI stages. Stage 1 sidelink control information (first stage SCI) may be referred to herein as SCI-1. Stage 2 sidelink control information (second stage SCI) may be referred to herein as SCI-2.

SCI-1 may be transmitted on a physical sidelink control channel (PSCCH). SCI-1 may include information for resource allocation of a sidelink resource and for decoding of the second stage of sidelink control information (i.e., SCI-2). SCI-1 may further identify a priority level (e.g., Quality of Service (QoS)) of a PSSCH. For example, ultra-reliable-low-latency communication (URLLC) traffic may have a higher priority than text message traffic (e.g., short message service (SMS) traffic). SCI-1 may also include a physical sidelink shared channel (PSSCH) resource assignment and a resource reservation period (if enabled). Additionally, SCI-1 may include a PSSCH demodulation reference signal (DMRS) pattern (if more than one pattern is configured). The DMRS may be used by a receiver for radio channel estimation for demodulation of the associated physical channel. As indicated, SCI-1 may also include information about the SCI-2, for example, SCI-1 may disclose the format of the SCI-2. Here, the format indicates the resource size of SCI-2 (e.g., a number of REs that are allotted for SCI-2), a number of a PSSCH DMRS port(s), and a modulation and coding scheme (MCS) index. In some examples, SCI-1 may use two bits to indicate the SCI-2 format. Thus, in this example, four different SCI-2 formats may be supported. SCI-1 may include other information that is useful for establishing and decoding a PSSCH resource.

SCI-2 may also be transmitted on the PSCCH and may contain information for decoding the PSSCH. According to some aspects, SCI-2 includes a 16-bit layer 1 (L1) destination identifier (ID), an 8-bit L1 source ID, a hybrid automatic repeat request (HARQ) process ID, a new data indicator (NDI), and a redundancy version (RV). For unicast communications, SCI-2 may further include a CSI report trigger. For groupcast communications, SCI-2 may further include a zone identifier and a maximum communication range for NACK. SCI-2 may include other information that is useful for establishing and decoding a PSSCH resource.

Figure 6C:
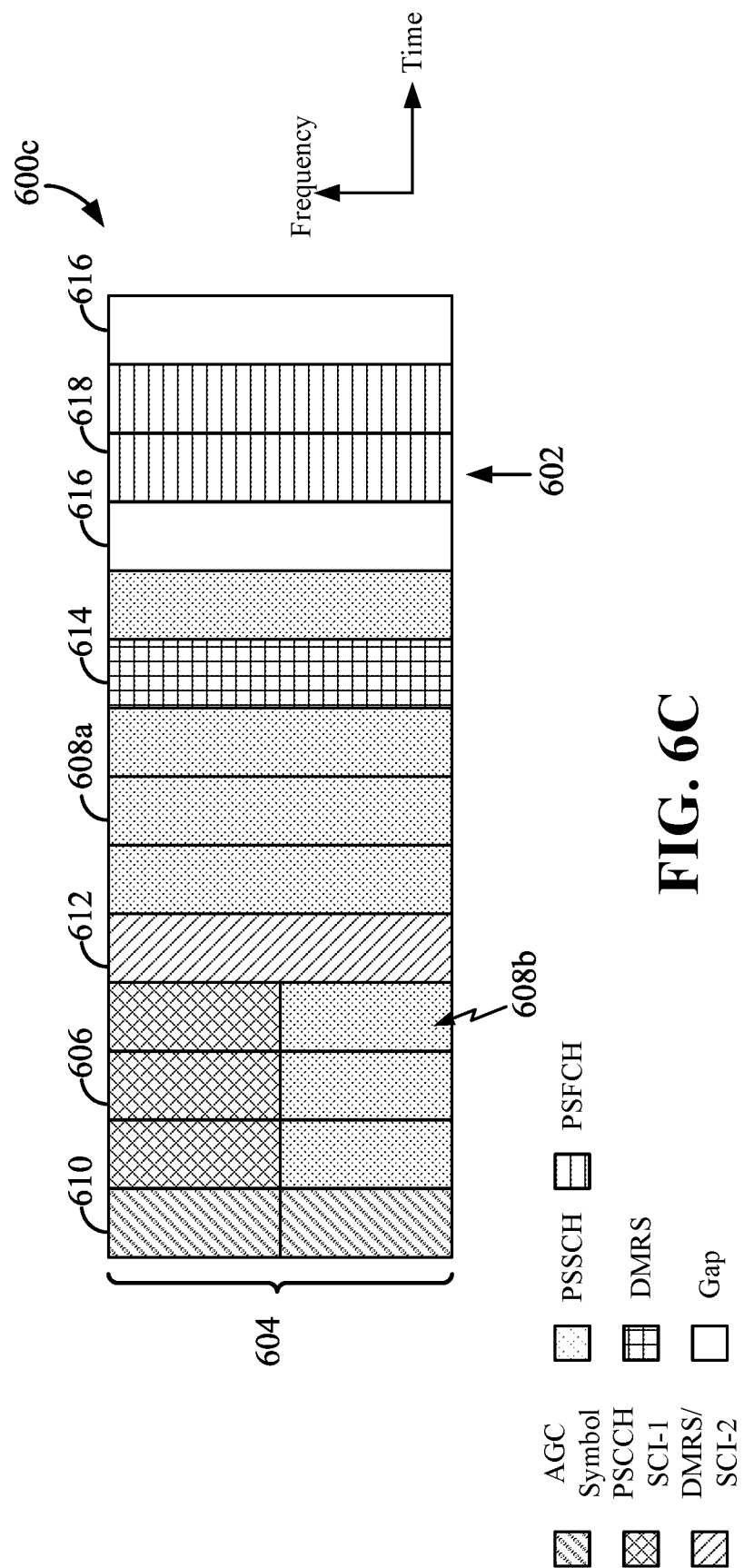

FIGS. 6A-6C illustrate examples of sidelink slot structures according to some aspects. The sidelink slot structures may be utilized, for example, in a V2X or other D2D network implementing sidelink. In the examples shown in FIGS. 6A-6C, time is in the horizontal direction with units of symbols 602 (e.g., OFDM symbols); and frequency is in the vertical direction. Here, a carrier bandwidth 604 allocated for sidelink communication is illustrated along the frequency axis. The carrier bandwidth 604 may include a plurality sub-channels, where each sub-channel may include a configurable number of PRBs (e.g., 10, 15, 20, 25, 50, 75, or 100 PRBs).

Each of FIGS. 6A-6C illustrate an example of a slot 600a-600c including fourteen symbols 602 that may be used for sidelink communication. However, it should be understood that sidelink communication can be configured to occupy fewer than fourteen symbols in a slot 600a-600c, and the disclosure is not limited to any particular number of symbols 602. Each sidelink slot 600a-600c includes a physical sidelink control channel (PSCCH) 606 occupying a control region 620 of the slot 600a-600c and a physical sidelink shared channel (PSSCH) 608 occupying a data region 622 of the slot 600a-600c. The PSCCH 606 and PSSCH 608 are each transmitted on one or more symbols 602 of the slot 600a. The PSCCH 606 includes, for example, SCI-1 that schedules transmission of data traffic on time-frequency resources of the corresponding PSSCH 608. As shown in FIGS. 6A-6C, the PSCCH 606 and corresponding PSSCH 608 are transmitted in the same slot 600a-600c.

In some examples, the PSCCH 606 duration is configured to be two or three symbols. In addition, the PSCCH 606 may be configured to span a configurable number of PRBs, limited to a single sub-channel. For example, the PSCCH 606 may span 10, 12, 15, 20, or 25 PRBs of a single sub-channel. A DMRS may further be present in every PSCCH symbol. In some examples, the DMRS may be placed on every fourth RE of the PSCCH 606. A frequency domain orthogonal cover code (FD-OCC) may further be applied to the PSCCH DMRS to reduce the impact of colliding PSCCH transmissions on the sidelink channel. For example, a transmitting wireless communication device may randomly select the FD-OCC from a set of pre-defined FD-OCCs. In each of the examples shown in FIGS. 6A-6C, the starting symbol for the PSCCH 606 is the second symbol of the corresponding slot 600a-600c and the PSCCH 606 spans three symbols 602.

The PSSCH 608 may be time-division multiplexed (TDMed) with the PSCCH 606 and/or frequency-division multiplexed (FDMed) with the PSCCH 606. In the examples shown in FIGS. 6A and 6C, the PSSCH 608 includes a first portion 608a that is TDMed with the PSCCH 606 and a second portion 608b that is FDMed with the PSCCH 606.

One and two layer transmissions of the PSSCH 608 may be supported with various modulation orders (e.g., QPSK, 16-QAM, 64-QAM and 256-QAM). In addition, the PSSCH 608 may include DMRSs 614 configured in a two, three, or four symbol DMRS pattern. For example, slots 600a and 600c shown in FIGS. 6A and 6C illustrate a two symbol DMRS pattern, while slot 600b shown in FIG. 6B illustrates a three symbol DMRS pattern. In some examples, the transmitting wireless communication device can select the DMRS pattern and indicate the selected DMRS pattern in SCI-1, according to channel conditions. The DMRS pattern may be selected, for example, based on the number of PSSCH 608 symbols in the slot 600a-600c. In addition, a gap symbol 616 is present after the PSSCH 608 in each slot 600a-600c.

Each slot 600a-600c further includes SCI-2 612 mapped to contiguous RBs in the PSSCH 608 starting from the first symbol containing a PSSCH DMRS. In the examples shown in FIGS. 6A and 6C, the first symbol containing a PSSCH DMRS is the fifth symbol occurring immediately after the last symbol carrying the PSCCH 606. Therefore, the SCI-2 612 is mapped to RBs within the fifth symbol. In the example shown in FIG. 6B, the first symbol containing a PSSCH DMRS is the second symbol, which also includes the PSCCH 606. In addition, the SCI-2/PSSCH DMRS 612 are shown spanning symbols two through five. As a result, the SCI-2/PSSCH DMRS 612 may be FDMed with the PSCCH 606 in symbols two through four and TDMed with the PSCCH 606 in symbol five.

The SCI-2 may be scrambled separately from the sidelink shared channel. In addition, the SCI-2 may utilize QPSK.

When the PSSCH transmission spans two layers, the SCI-2 modulation symbols may be copied on both layers. The SCI-1 in the PSCCH 606 may be blind decoded at the receiving wireless communication device. However, since the format, starting location, and number of REs of the SCI-2 612 may be derived from the SCI-1, blind decoding of SCI-2 is not needed at the receiver (receiving wireless communication device).

In each of FIGS. 6A-6C, the second symbol of each slot 600a-600c is copied onto (repeated on) a first symbol 610 thereof for automatic gain control (AGC) settling. For example, in each of FIGS. 6A and 6C, the second symbol containing the PSCCH 606 FDMed with the second portion 608b of the PSSCH 608 may be transmitted on both the first symbol and the second symbol. In the example shown in FIG. 6B, the second symbol containing the PSCCH 606 FDMed with the SCI-2/PSSCH DMRS 612 may be transmitted on both the first symbol and the second symbol.

As shown in FIG. 6C, HARQ feedback may be transmitted on a physical sidelink feedback channel (PSFCH) 618 in a configurable resource period of 0, 1, 2, or 4 slots. In sidelink slots (e.g., slot 600c) containing the PSFCH 618, one symbol 602 may be allocated to the PSFCH 618, and the PSFCH 618 may be copied onto (repeated on) a previous symbol for AGC settling. In the example shown in FIG. 6C, the PSFCH 618 is transmitted on the thirteenth symbol and copied onto the twelfth symbol in the slot 600c. A gap symbol 616 may further be placed after the symbols of the PSFCH 618.

For FR2 sidelink operation, the SCI-1 (PSCCH 606), SCI-2 (SCI-2/PSSCH DMRS 612), and sidelink data traffic (PSSCH 608) may each be transmitted on a selected beam. In some examples, the SCI-1, SCI-2, and sidelink data traffic may each be transmitted on the same beam. In other examples, one or more of the SCI-1, SCI-2, and sidelink data traffic may be transmitted on different beams. In addition, feedback information (PSFCH 618) corresponding to the sidelink data traffic may further be received on the same or a different beam than the sidelink data traffic. Various aspects of the present disclosure relate to configuration and indication of the selected beam(s) for transmitting the SCI-1, SCI-2, data traffic, and feedback information.

In NR, transmissions on a Uu link between a UE and a base station may include sequences or may be scrambled using the sequences, where the sequences may be generated based on an initial seed. This initial seed may be configurable and may be based on a Radio Network Temporary Identifier (RNTI) and/or a Cell Identifier (Cell ID). Exemplary cases of transmissions in which sequences are used within this context include one or more of: PDCCH DMRS sequences; PDCCH coded bit scrambling; PDSCH and PUSCH DMRS sequences; PDSCH and PUSCH coded bit scrambling; and PBCH payload and coded bit scrambling.

Sequence generators may be used to encode sidelink communications. Approaches to initialize such sequence generators are being developed. Accordingly, various aspects disclosed herein are directed towards initializing sequence generators to facilitate various types of sidelink communications. For instance, aspects disclosed herein include aspects directed towards initializing sequence generators for scrambling coded bits. In addition, aspects disclosed herein further include aspects directed towards initializing sequence generators used for various reference signals. Examples disclosed herein include initializing sequence generators for scrambling: coded bits in the Physical Sidelink Control Channel (PSCCH); coded bits in the Physical Sidelink Shared Channel (PSSCH); coded bits in the Physical Sidelink Broadcast Channel (PSBCH); and/or coded bits associated with a second stage sidelink control information (SCI) communication. Other examples disclosed herein include initializing sequence generators for: a Demodulation Reference Signal (DMRS) sequence (e.g., for PSCCH, PSSCH, or PSBCH); a Physical Sidelink Feedback Channel (PSFCH); a Phase-tracking Reference Signal (PTRS); and/or a Channel State Information Reference Signal (CSI-RS).

The second stage SCI (SCI-2) may be carried within a resource of a corresponding PSSCH and may be associated with a DMRS of the PSSCH. Scrambling for the first stage SCI, scrambling for the second stage SCI, and scrambling for data on the PSSCH may be performed independently from each other. For example, a scrambling operation for the second stage SCI may be applied separately from the PSSCH.

At least one seed may be input into a sequence generator for a scrambling operation, such that the sequence generator may perform the scrambling operation based on the at least one seed. For the two SCI stages in sidelink communication, seeds may be defined for the first stage SCI and the second stage SCI. Hence, for example, different seeds may be defined for the first stage SCI, for the second stage SCI, for data, and for CSI-RS.

According to some aspects of the disclosure, depending on a type of sidelink communication, a different seed may be used by a UE to initialize a sequence generator, such that the sequence generator may be used for transmission of the sidelink communication based on the seed. The UE may be a UE illustrated in one or more of FIGS. 1-4. For example, a first UE may input a particular seed associated with a particular type of sidelink communication into a sequence generator, which scrambles data associated with the sidelink communication based on the seed, and then may transmit the scrambled data to a second UE via a sidelink. When the second UE receives the scrambled data, the second UE may decode the scrambled data to retrieve the data associated with the sidelink communication.

Figure 7:
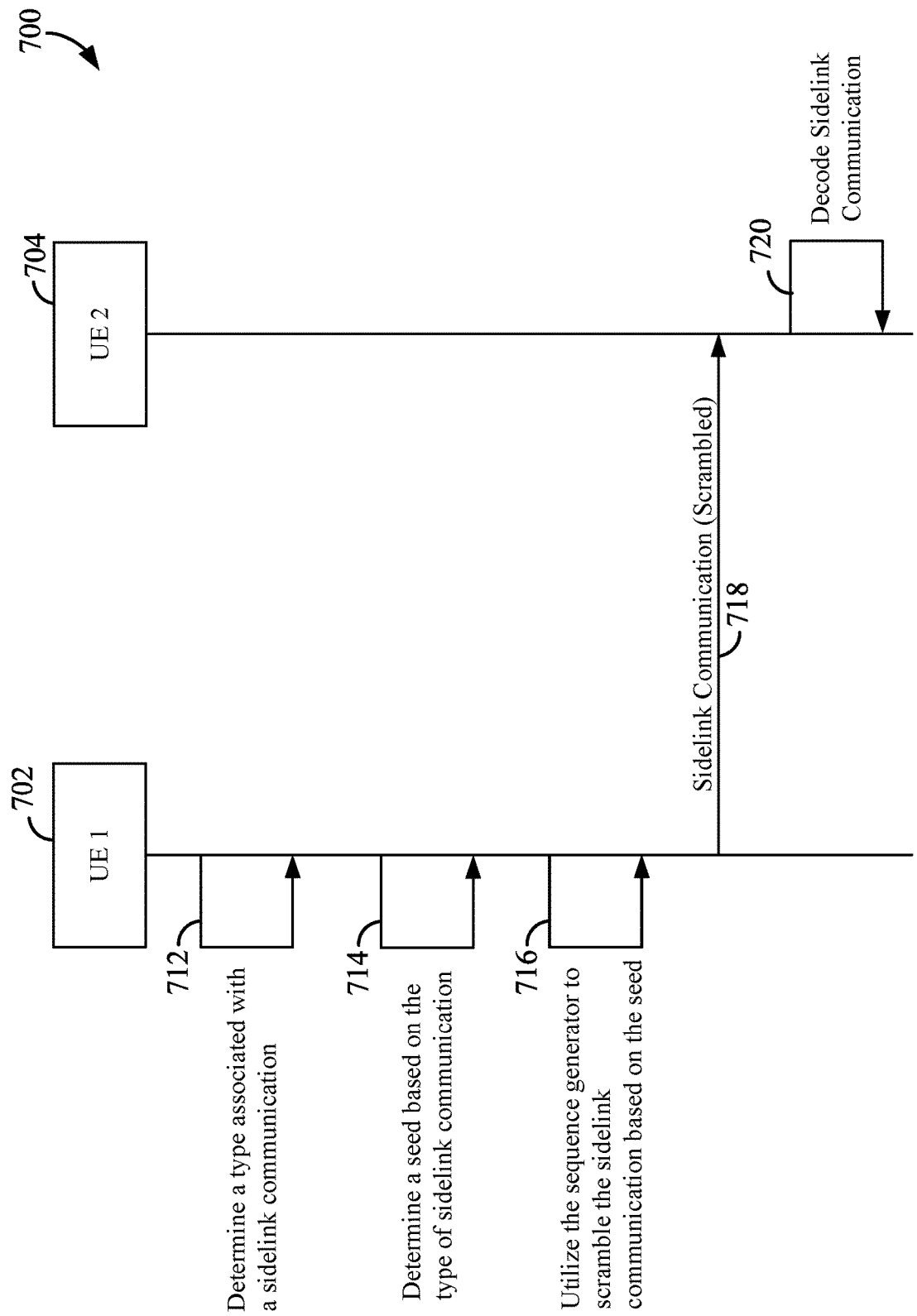
FIG. 7 is an example flow diagram illustrating a sidelink communication between two user equipment, according to some aspects.

FIG. 7 is an example flow diagram 700 illustrating a sidelink communication between two UEs, according to some aspects. In FIG. 7, a first UE 702 and a second UE 704 may communicate with each other via a sidelink. At 712, the first UE 702 may determine a type associated with a sidelink communication to be transmitted to the second UE 704. At 714, the first UE 702 may determine a seed based on the type associated with the sidelink communication and may initialize a sequence generator by inputting the seed into the sequence generator. At 716, the first UE 702 may use the sequence generator to scramble the sidelink communication based on the seed. At 718, the scrambled sidelink communication may be transmitted from the first UE 702 to the second UE 704. At 720, the second UE 704 may decode the scrambled sidelink communication to retrieve the sidelink communication.

In an aspect, the type of sidelink communication may be a PSCCH communication. In an aspect, the UE may initialize the sequence generator with a seed to scramble coded bits associated with the PSCCH communication. The UE may determine the seed based on a sub-channel where the PSCCH communication is transmitted, where the seed is input into the sequence generator such that the sequence generator may scramble the coded bits based on the seed. For example, the seed may be calculated based on a sub-channel index indicating the sub-channel used to transmit the PSCCH communication.

In an aspect, the UE may initialize the sequence generator with a seed to scramble a reference signal such as a DMRS associated with the PSCCH communication. The UE may determine the seed based on a sub-channel where the PSCCH communication is transmitted, where the seed is input into the sequence generator such that the sequence generator may scramble the DMRS associated with the PSCCH communication based on the seed. For example, the seed may be calculated based on a sub-channel index indicating the sub-channel used to transmit the PSCCH communication.

In an aspect, the type of sidelink communication may be a second stage SCI communication. In an aspect, the UE may initialize the sequence generator with a seed to scramble second stage SCI coded bits (e.g., coded bits of a control portion of the second stage SCI) associated with a PSSCH. The seed may be input into the sequence generator such that the sequence generator may scramble the second stage SCI coded bits based on the seed. The seed for scrambling the second stage SCI coded bits may be determined according to one of several approaches. In one example, the seed may be configured per resource pool. In this example, a fixed seed may be preconfigured per resource pool. In another example, the seed may be determined based on a sub-channel where a corresponding PSSCH is transmitted. In another example, the seed may be determined based on a sub-channel where a transmission of the second stage SCI starts. For example, the second stage SCI may span over multiple sub-channels, and the seed may be determined based on one of the multiple sub-channels where the transmission of the second stage SCI starts.

In an aspect, the type of sidelink communication may be a PSSCH communication. In an aspect, the UE may initialize the sequence generator with a seed to scramble PSCCH coded bits (e.g., coded data bits) associated with the PSSCH communication. The seed for scrambling the PSCCH coded bits may be determined according to one of several approaches. In one example, the seed may be configured per resource pool. In this example, a fixed seed may be preconfigured per resource pool. In another example, the seed may be calculated from a CRC of a corresponding second stage SCI communication. In another example, the seed may be determined based on a sub-channel where the PSSCH is transmitted. In another example, the seed may be determined based on a sub-channel where a transmission of the second stage SCI starts.

In an aspect, the UE may initialize the sequence generator with a seed to scramble a reference signal such as a DMRS associated with the PSSCH communication. The seed for scrambling the DMRS associated with the PSSCH may be determined according to one of several approaches. In one example, the seed may be configured per resource pool. In this example, a fixed seed may be preconfigured per resource pool. In another example, the seed may be calculated from a CRC of a corresponding second stage SCI communication. In another example, the seed may be determined based on a sub-channel where the PSSCH is transmitted. In another example, the seed may be determined based on a sub-channel where a transmission of the second stage SCI starts.

In an aspect, the type of sidelink communication may be a PSBCH communication. In an aspect, the UE may initialize the sequence generator with a seed to scramble PSBCH coded bits associated with the PSBCH communication. The seed for scrambling the PSBCH coded bits may be determined according to one of several approaches. In one example, the seed may be configured per resource pool. In this example, a fixed seed may be preconfigured per resource pool. In another example, the seed may be calculated based on at least one of a PSBCH transmission time, a slot index, or a distributed frame number.

In an aspect, the type of sidelink communication may be a phase-tracking reference signal (PTRS) communication. The PTRS has been introduced in 5G NR to enable devices operating on millimeter wave (mmWave) frequency bands to estimate and compensate for the phase noise. In an aspect, the UE may initialize the sequence generator with a seed to scramble a reference signal such as a DMRS associated with a PTRS. The seed for scrambling the DMRS associated with the PTRS may be determined according to one of several approaches. In one example, the seed may be configured per resource pool. In this example, a fixed seed may be preconfigured per resource pool. In another example, the seed may be calculated from a CRC of a corresponding first stage SCI communication. In another example, the seed may be calculated from a CRC of a corresponding second stage SCI communication. In another example, the seed may be calculated from a source ID. In another example, the seed may be calculated from a destination ID.

In an aspect, the type of sidelink communication may be a CSI-RS communication. In an aspect, the UE may initialize the sequence generator with a seed to scramble CSI-RS coded bits associated with the CSI-RS communication. The seed for scrambling the CSI-RS coded bits may be determined according to one of several approaches. In an example, the seed may be calculated from a CRC of a corresponding second stage SCI communication. In another example, the seed may be calculated from a source ID. In another example, the seed may be calculated from a destination ID.

In an aspect, the type of sidelink communication may be a PSFCH communication. In an aspect, the UE may initialize the sequence generator with a seed to scramble a PSFCH. The seed for scrambling the PSFCH may be configured per resource pool. In this example, a fixed seed may be preconfigured per resource pool.

Figure 8:
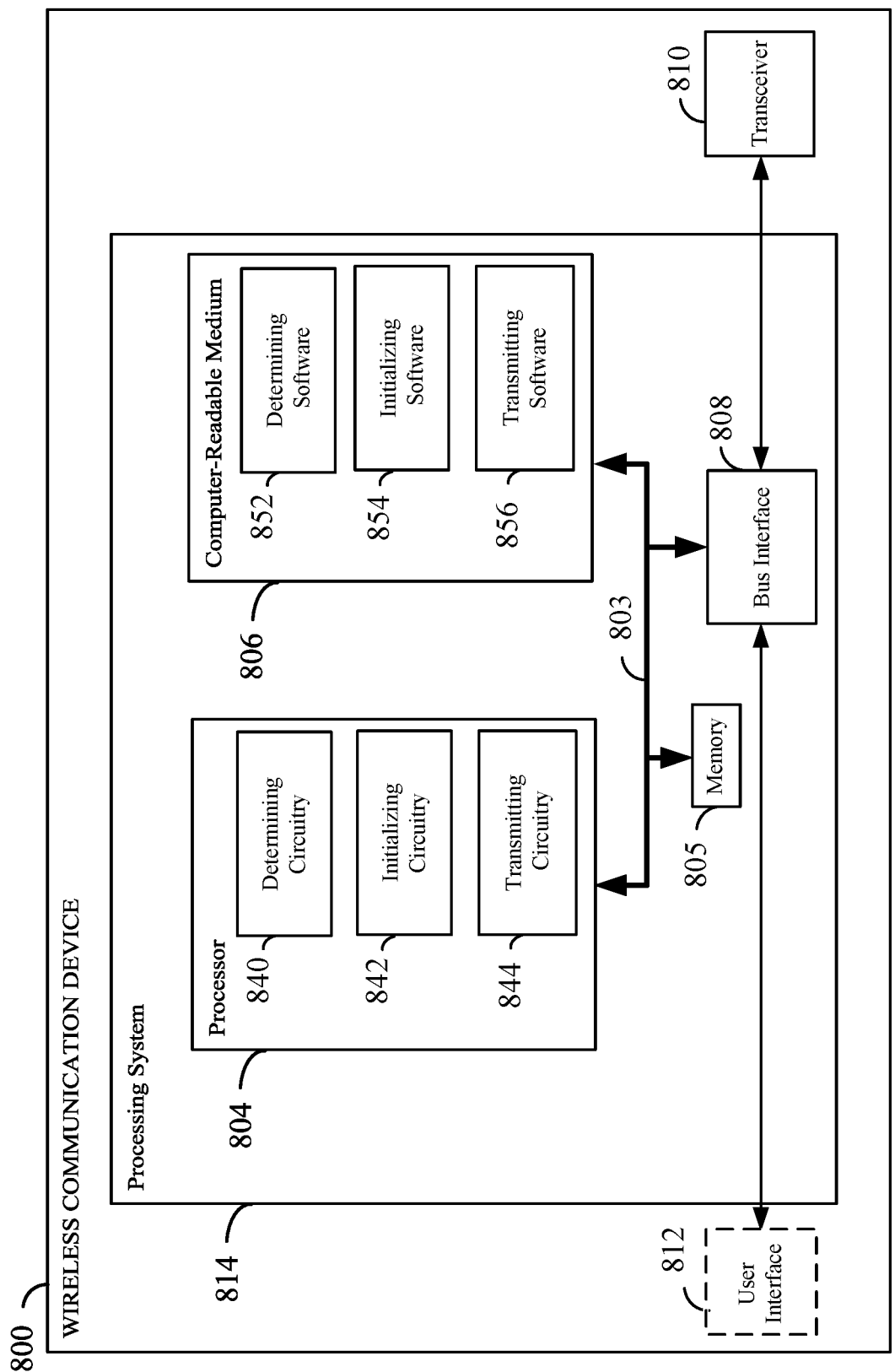
FIG. 8 is a block diagram illustrating an example of a hardware implementation for a wireless communication device employing a processing system according to some aspects.

FIG. 8 is a block diagram illustrating an example of a hardware implementation for a wireless communication device 800 employing a processing system 814. For example, the wireless communication device 800 may be a UE as illustrated in any one or more of the FIGS. 1-4 and 7 disclosed herein.

The wireless communication device 800 may be implemented with a processing system 814 that includes one or more processors 804. Examples of processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 800 may be configured to perform any one or more of the functions described herein. That is, the processor 804, as utilized in a wireless communication device 800, may be used to implement any one or more of the processes and procedures described below and illustrated in FIGS. 9-11.

In this example, the processing system 814 may be implemented with a bus architecture, represented generally by the bus 802. The bus 802 may include any number of interconnecting buses and bridges depending on the specific application of the processing system 814 and the overall design constraints. The bus 802 communicatively couples together various circuits including one or more processors (represented generally by the processor 804), a memory 805, and computer-readable media (represented generally by the computer-readable storage medium 806). The bus 802 may also link various other circuits such as timing sources, peripherals, voltage regulators, and power management circuits, which are well known in the art, and therefore, will not be described any further. A bus interface 808 provides an interface between the bus 802 and a transceiver 810. The transceiver 810 provides a communication interface or means for communicating with various other apparatus over a transmission medium. Depending upon the nature of the apparatus, a user interface 812 (e.g., keypad, display, speaker, microphone, joystick) may also be provided.

The processor 804 is responsible for managing the bus 802 and general processing, including the execution of software stored on the computer-readable storage medium 806. The software, when executed by the processor 804, causes the processing system 814 to perform the various functions described below for any particular apparatus. The computer-readable storage medium 806 and the memory 805 may also be used for storing data that is manipulated by the processor 804 when executing software.

One or more processors 804 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable storage medium 806. Similar to computer-readable storage medium 806, computer-readable storage medium 806 may be a non-transitory computer-readable storage medium comprising characteristics that are substantially similar. The computer-readable storage medium 806 may reside in the processing system 814, external to the processing system 814, or distributed across multiple entities including the processing system 814. It should also be appreciated that, similar to computer-readable storage medium 806, computer-readable storage medium 806 may be embodied in a computer program product comprising characteristics that are substantially similar.

In some aspects of the disclosure, the processor 804 may include circuitry configured for various functions. For example, the processor 804 may include a determining circuitry 840 configured for various functions, including, for example, to determine a type associated with a sidelink communication. As illustrated, the processor 804 may also include an initializing circuitry 842 configured for various functions. For instance, the initializing circuitry 842 may be configured to initialize a sequence generator with a seed, wherein the seed is based on the type associated with the sidelink communication. The processor 804 may further include a transmitting circuitry 844 configured for various functions, including, for example, to utilize the sequence generator to facilitate transmitting at least a portion of the sidelink communication. It should also be appreciated that, the combination of the determining circuitry 840, the initializing circuitry 842, and the transmitting circuitry 844 may be configured to implement one or more of the functions described herein.

Various other aspects for wireless communication device 800 are also contemplated. For instance, where the type associated with the sidelink communication is a PSCCH communication, it is contemplated that the transmitting circuitry 844 may be configured to utilize the sequence generator to scramble coded bits associated with the PSCCH communication, wherein the initializing circuitry 842 may be configured to select the seed based on a sub-channel where the PSCCH communication is transmitted. In another aspect where the type associated with the sidelink communication is a PSCCH communication, it is contemplated that the transmitting circuitry 844 may be configured to transmit a reference signal associated with the PSCCH communication, wherein the initializing circuitry 842 may be configured to select the seed based on a sub-channel where the PSCCH communication is transmitted.

Various aspects are also contemplated where the type associated with the sidelink communication is a second stage SCI communication. For instance, in one aspect it is contemplated that the transmitting circuitry 844 may be configured to utilize the sequence generator to scramble coded bits associated with a control portion of the second stage SCI communication. In another aspect, it is contemplated that the transmitting circuitry 844 may be configured to utilize the sequence generator to scramble coded bits associated with a data portion of the second stage SCI communication.

When the type associated with the sidelink communication is a second stage SCI communication, various aspects are also contemplated for selecting the seed. For instance, in one aspect it is contemplated that the initializing circuitry 842 may be configured to select the seed based on a pre-configuration of the seed according to a corresponding resource pool; a sub-channel of a corresponding PSCCH; and/or a sub-channel where the second stage SCI communication begins.

Various aspects are also contemplated where the type associated with the sidelink communication is a PSSCH communication. For instance, in one aspect it is contemplated that the transmitting circuitry 844 may be configured to utilize the sequence generator to scramble coded bits associated with the PSSCH communication. Within such example, the initializing circuitry 842 may then be configured to select the seed based on a pre-configuration of the seed according to a corresponding resource pool; calculate the seed from a cyclic redundancy check (CRC) of a corresponding second stage SCI communication; select the seed based on a sub-channel of a corresponding PSCCH; or select the seed based on a sub-channel where a corresponding second stage SCI communication begins.

When the type associated with the sidelink communication is a PSSCH communication, various other aspects are also contemplated. For instance, in one aspect it is contemplated that the transmitting circuitry 844 may be configured to utilize the sequence generator to transmit a reference signal associated with the PSSCH communication. Within such example, the initializing circuitry 842 may then be configured to select the seed based on a pre-configuration of the seed according to a corresponding resource pool; calculate the seed from a CRC of a corresponding second stage SCI communication; select the seed based on a sub-channel of a corresponding PSCCH; or select the seed based on a sub-channel where a corresponding second stage SCI communication begins.

Various aspects are also contemplated where the type associated with the sidelink communication is a PSBCH communication. For instance, in one aspect it is contemplated that the transmitting circuitry 844 may be configured to utilize the sequence generator to scramble coded bits associated with the PSBCH communication and/or utilize the sequence generator to transmit a reference signal associated with the PSBCH communication. Within such example, the initializing circuitry 842 may then be configured to select the seed based on a pre-configuration of the seed according to a corresponding resource pool; calculate the seed from a CRC of a corresponding second stage SCI communication; select the seed based on a sub-channel of a corresponding PSCCH; or select the seed based on a sub-channel where a corresponding second stage SCI communication begins.

When the type associated with the sidelink communication is a PSBCH communication, various aspects are also contemplated for selecting the seed. For instance, in one aspect it is contemplated that the initializing circuitry 842 may be configured to select the seed based on a pre-configuration of the seed according to a corresponding resource pool. In another aspect, it is contemplated that the initializing circuitry 842 may be configured to calculate the seed based on at least one of a PSBCH transmission time, slot index, or distributed frame number.

Various aspects are also contemplated where the type associated with the sidelink communication is a PTRS communication. For instance, in one aspect it is contemplated that the initializing circuitry 842 may be configured to select the seed based on a pre-configuration of the seed according to a corresponding resource pool; calculate the seed from a CRC of a corresponding first or second stage SCI communication; calculate the seed from a source identifier associated with the PTRS communication; or calculate the seed from a destination identifier associated with the PTRS communication.

Various aspects are also contemplated where the type associated with the sidelink communication is a CSI-RS communication. For instance, in one aspect it is contemplated that the initializing circuitry 842 may be configured to calculate the seed from a CRC of a corresponding second stage SCI communication; calculate the seed from a source identifier associated with the CSI-RS communication; or calculate the seed from a destination identifier associated with the CSI-RS communication.

Various aspects are also contemplated where the type associated with the sidelink communication is a PSFCH communication. For instance, in one aspect it is contemplated that the initializing circuitry 842 may be configured to select the seed based on a pre-configuration of the seed according to a corresponding resource pool.

In one or more examples, the computer-readable storage medium 806 may include determining software 852 configured for various functions, including, for example, to determine a type associated with a sidelink communication. As illustrated, the computer-readable storage medium 806 may also include initializing software 854 configured for various functions. For instance, the initializing software 854 may be configured to initialize a sequence generator with a seed, wherein the seed is based on the type associated with the sidelink communication. The computer-readable storage medium 806 may further include transmitting software 856 configured for various functions, including, for example, to utilize the sequence generator to facilitate transmitting at least a portion of the sidelink communication. It should also be appreciated that, the combination of the determining software 852, the initializing software 854, and the transmitting software 856 may be configured to implement one or more of the functions described herein.

In a particular configuration, it is also contemplated that the wireless communication device 800 includes means for determining a type associated with a sidelink communication; means for initializing a sequence generator with a seed in which the seed is based on the type associated with the sidelink communication; and means for utilizing the sequence generator to facilitate transmitting at least a portion of the sidelink communication. In one aspect, the aforementioned means may be the processor(s) 804 configured to perform the functions recited by the aforementioned means. In another aspect, the aforementioned means may be a circuit or any apparatus configured to perform the functions recited by the aforementioned means.

Figure 9:
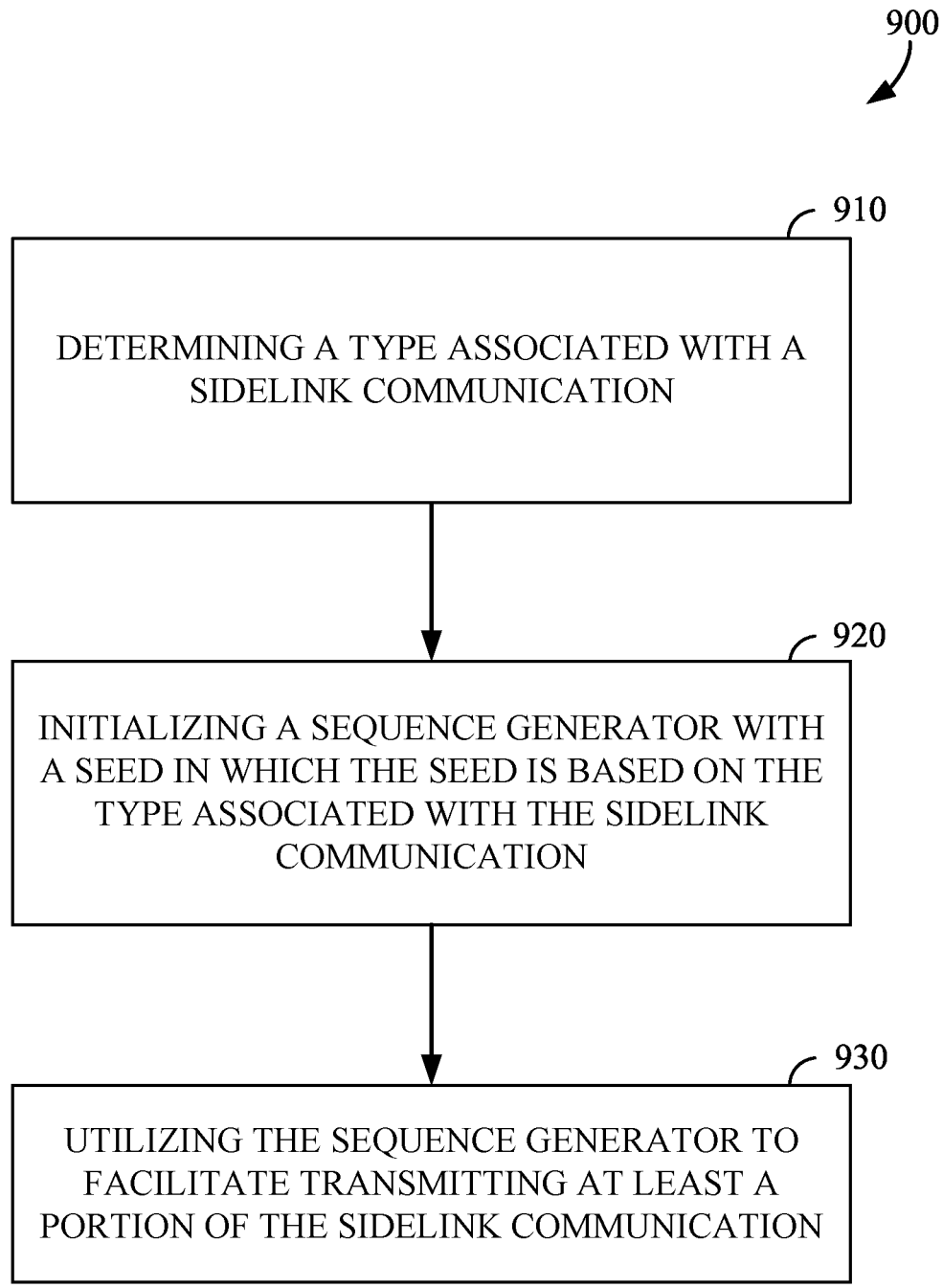
FIG. 9 is a flow chart illustrating an exemplary wireless communication device process that facilitates some aspects.
Figure 10:
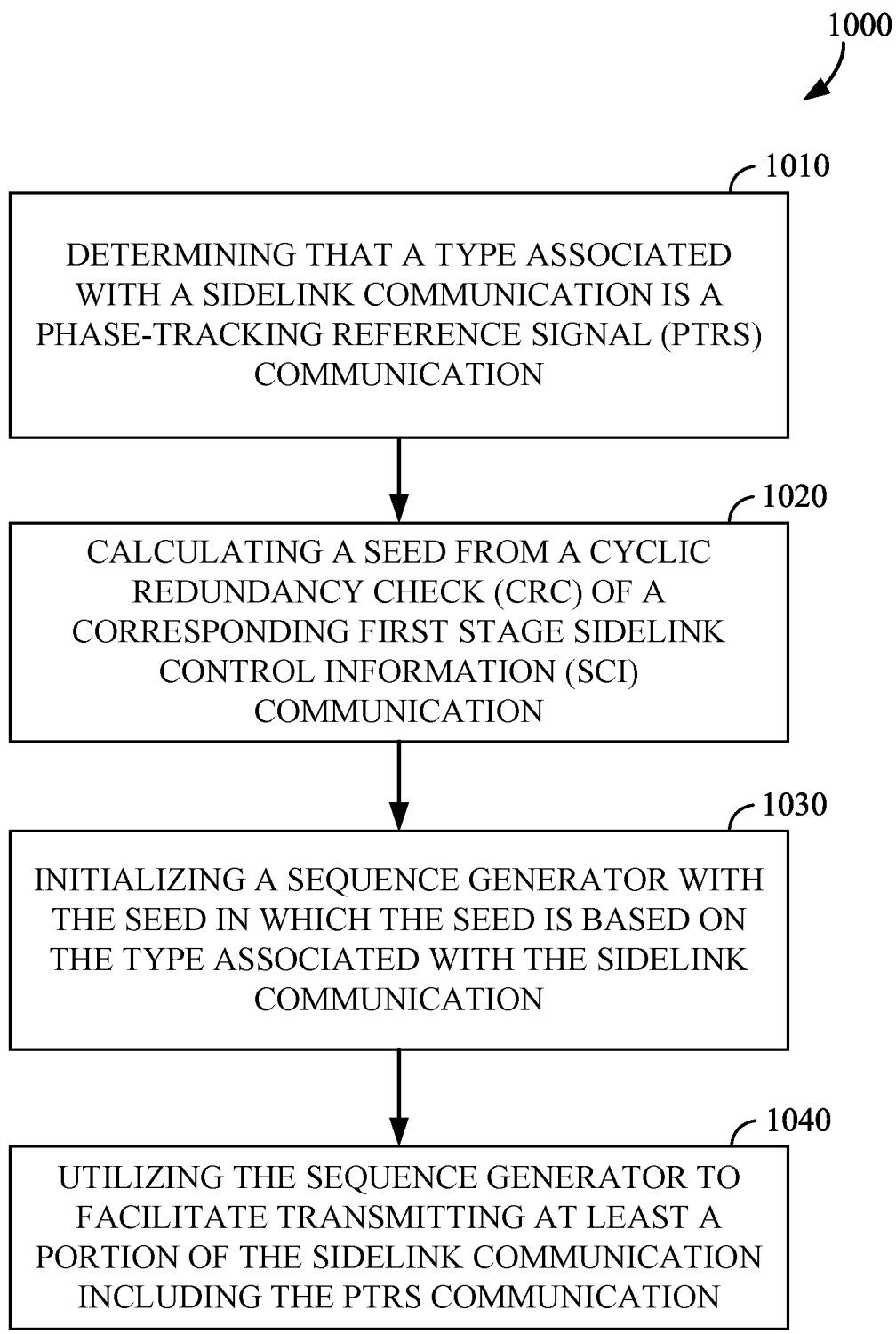
FIG. 10 is a flow chart illustrating an exemplary wireless communication device process that facilitates some aspects.
Figure 11:
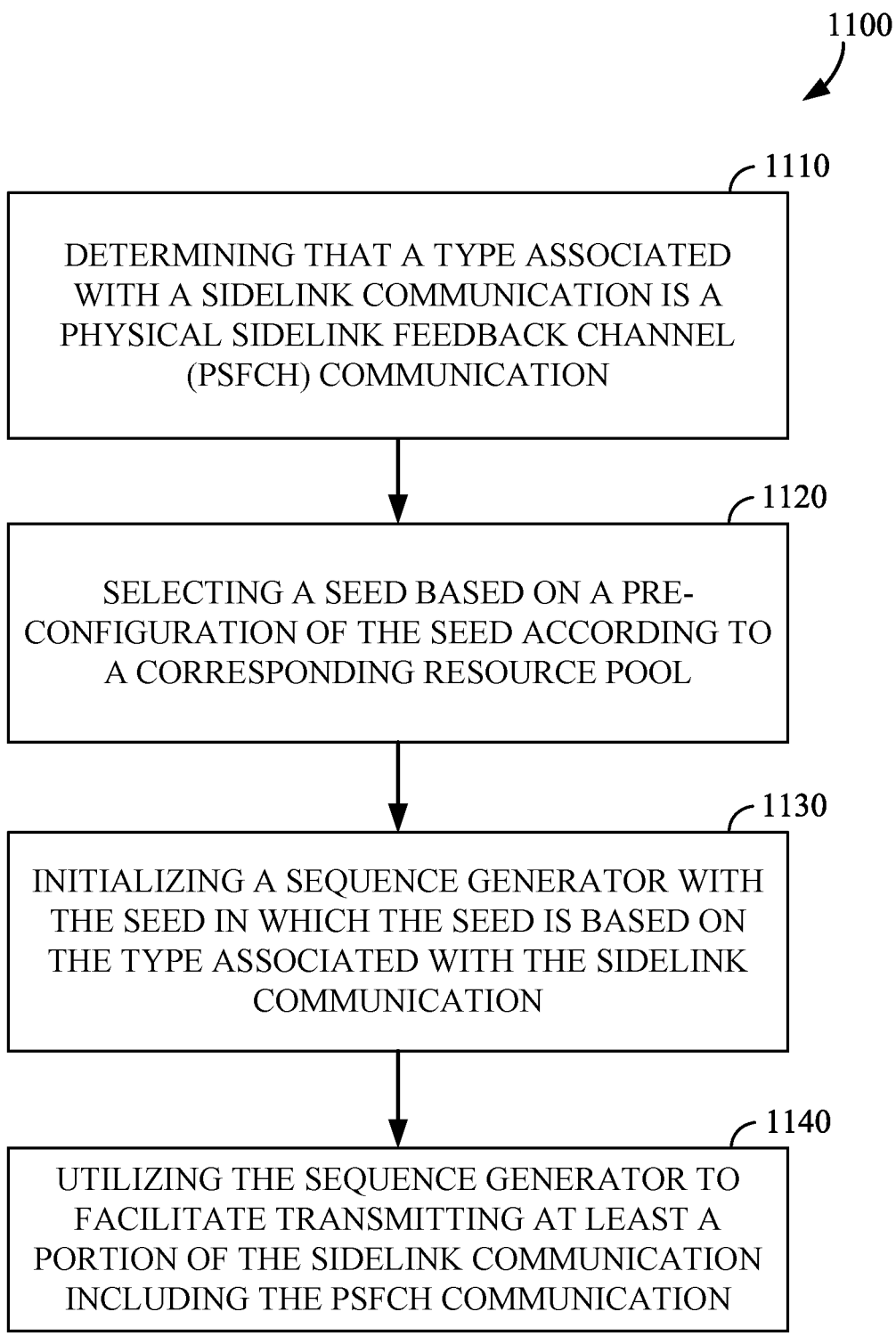
FIG. 11 is a flow chart illustrating an exemplary wireless communication device process that facilitates some aspects.

Of course, in the above examples, the circuitry included in the processor 804 is merely provided as an example, and other means for carrying out the described functions may be included within various aspects of the present disclosure, including but not limited to the instructions stored in the computer-readable storage medium 806, or any other suitable apparatus or means described herein, and utilizing, for example, the processes and/or algorithms described in relation to FIGS. 9-11.

In FIG. 9, a flow chart is provided, which illustrates an exemplary wireless communication device process for performing some aspects of the disclosure. As described below, some or all illustrated features may be omitted in a particular implementation within the scope of the present disclosure, and some illustrated features may not be required for implementation of all examples. In some examples, the process 900 may be carried out by the wireless communication device 800 illustrated in FIG. 8. In some examples, the process 900 may be carried out by any suitable apparatus or means for carrying out the functions or algorithm described below.

Process 900 begins at block 910 with the wireless communication device 800 determining a type associated with a sidelink communication. For example, the determining circuitry 840 shown and described above in connection with FIG. 8 may provide a means for determining the type associated with the sidelink communication.

At block 920, process 900 continues with the wireless communication device 800 initializing a sequence generator with a seed in which the seed is based on the type associated with the sidelink communication. For example, the initializing circuitry 842 shown and described above in connection with FIG. 8 may provide a means for initializing the sequence generator.

Process 900 then concludes block 930 where the wireless communication device 800 utilizes the sequence generator to facilitate transmitting at least a portion of the sidelink communication. For example, the transmitting circuitry 844 shown and described above in connection with FIG. 8 may provide a means for utilizing the sequence generator to facilitate transmitting the at least a portion of the sidelink communication.

In an aspect, the type associated with the sidelink communication may be a PSCCH communication. In an aspect, the utilizing may include utilizing the sequence generator to scramble coded bits associated with the PSCCH communication. In this aspect, the initializing at block 920 may include selecting the seed based on a sub-channel where the PSCCH communication may be transmitted. In an aspect, the utilizing at block 930 may include utilizing the sequence generator to transmit a reference signal associated with the PSCCH communication. In this aspect, the initializing at block 920 may include selecting the seed based on a sub-channel where the PSCCH communication may be transmitted.

In an aspect, the type associated with the sidelink communication may be a second stage SCI communication. In an aspect, the utilizing at block 930 may include utilizing the sequence generator to scramble coded bits of the second stage SCI communication. In an aspect, the initializing at block 920 may include selecting the seed based on a pre-configuration of the seed according to a corresponding resource pool. In an aspect, the initializing at block 920 may include selecting the seed based on a sub-channel of a corresponding PSCCH. In an aspect, the initializing at block 920 may include selecting the seed based on a sub-channel where the second stage SCI communication begins.

In an aspect, the type associated with the sidelink communication may be a PSSCH communication. In an aspect, the utilizing at block 930 may include utilizing the sequence generator to scramble coded bits associated with the PSSCH communication. In an aspect, the initializing at block 920 may include selecting the seed based on a pre-configuration of the seed according to a corresponding resource pool. In an aspect, the initializing at block 920 may include calculating the seed from a CRC of a corresponding second stage SCI communication. In an aspect, the initializing at block 920 may include selecting the seed based on a sub-channel of a corresponding PSCCH. In an aspect, the initializing at block 920 may include selecting the seed based on a sub-channel where a corresponding second stage SCI communication begins.

In an aspect, the utilizing at block 930 may include utilizing the sequence generator to transmit a reference signal associated with the PSSCH communication. In an aspect, the initializing at block 920 may include selecting the seed based on a pre-configuration of the seed according to a corresponding resource pool. In an aspect, the initializing at block 920 may include calculating the seed from a CRC of a corresponding second stage SCI communication. In an aspect, the initializing at block 920 may include selecting the seed based on a sub-channel of a corresponding PSCCH. In an aspect, the initializing at block 920 may include selecting the seed based on a sub-channel where a corresponding second stage SCI communication begins.

In an aspect, the type associated with the sidelink communication may be a PSBCH communication. In an aspect, the utilizing at block 930 may include utilizing the sequence generator to scramble coded bits associated with the PSBCH communication. In an aspect, the utilizing at block 930 may include utilizing the sequence generator to transmit a reference signal associated with the PSBCH communication. In an aspect, the initializing at block 920 may include selecting the seed based on a pre-configuration of the seed according to a corresponding resource pool. In an aspect, the initializing at block 920 may include calculating the seed based on at least one of a PSBCH transmission time, slot index, or distributed frame number.

In an aspect, the type associated with the sidelink communication may be a PTRS communication. In an aspect, the utilizing at block 930 may include utilizing the sequence generator to transmit the PTRS communication. In an aspect, the initializing at block 920 may include selecting the seed based on a pre-configuration of the seed according to a corresponding resource pool. In an aspect, the initializing at block 920 may include calculating the seed from a CRC of a corresponding first stage SCI communication. In an aspect, the initializing at block 920 may include calculating the seed from a CRC of a corresponding second stage SCI communication. In an aspect, the initializing at block 920 may include calculating the seed from a source identifier associated with the PTRS communication. In an aspect, the initializing at block 920 may include calculating the seed from a destination identifier associated with the PTRS communication.

In an aspect, the type associated with the sidelink communication may be a CSI-RS communication, and the utilizing at block 930 may include utilizing the sequence generator to transmit the CSI-RS communication. In an aspect, the initializing at block 920 may include calculating the seed from a CRC of a corresponding second stage SCI communication. In an aspect, the initializing at block 920 may include calculating the seed from a source identifier associated with the CSI-RS communication. In an aspect, the initializing at block 920 may include calculating the seed from a destination identifier associated with the CSI-RS communication.

In an aspect, the type associated with the sidelink communication may be a PSFCH communication. In an aspect, the initializing at block 920 may include selecting the seed based on a pre-configuration of the seed according to a corresponding resource pool.

In one configuration, the wireless communication device 800 includes means for determining a type associated with a sidelink communication, means for initializing a sequence generator with a seed, wherein the seed is based on the type associated with the sidelink communication, and means for utilizing the sequence generator to facilitate transmitting at least a portion of the sidelink communication. In one aspect, the aforementioned means may be the processor 804 shown in FIG. 8 configured to perform the functions recited by the aforementioned means. In another aspect, the aforementioned means may be a circuit or any apparatus configured to perform the functions recited by the aforementioned means.

In FIG. 10, a flow chart is provided, which illustrates an exemplary wireless communication device process for performing some aspects of the disclosure. As described below, some or all illustrated features may be omitted in a particular implementation within the scope of the present disclosure, and some illustrated features may not be required for implementation of all examples. In some examples, the process 1000 may be carried out by the wireless communication device 800 illustrated in FIG. 8. In some examples, the process 1000 may be carried out by any suitable apparatus or means for carrying out the functions or algorithm described below.

Process 1000 begins at block 1010 with the wireless communication device 800 determining that a type associated with a sidelink communication is a PTRS communication. For example, the determining circuitry 840 shown and described above in connection with FIG. 8 may provide a means for determining that the type associated with the sidelink communication is the PTRS communication.

At block 1020, process 1000 continues with the wireless communication device 800 calculating a seed from a CRC of a corresponding first stage SCI communication. For example, the initializing circuitry 842 shown and described above in connection with FIG. 8 may provide a means for calculating the seed.

At block 1030, process 1000 further continues with the wireless communication device 800 initializing a sequence generator with the seed in which the seed is based on the type associated with the sidelink communication. For example, the initializing circuitry 842 shown and described above in connection with FIG. 8 may provide a means for initializing the sequence generator.

Process 1000 then concludes block 1040 where the wireless communication device 800 utilizes the sequence generator to facilitate transmitting at least a portion of the sidelink communication including the PTRS communication. For example, the transmitting circuitry 844 shown and described above in connection with FIG. 8 may provide a means for utilizing the sequence generator to facilitate transmitting the at least the portion of the sidelink communication including the PTRS communication.

In one configuration, the wireless communication device 800 includes means for determining that a type associated with a sidelink communication is a PTRS communication, means for calculating a seed from a CRC of a corresponding first stage SCI communication, means for initializing a sequence generator with the seed in which the seed is based on the type associated with the sidelink communication, and means for utilizing the sequence generator to facilitate transmitting at least a portion of the sidelink communication including the PTRS communication. In one aspect, the aforementioned means may be the processor 804 shown in FIG. 8 configured to perform the functions recited by the aforementioned means. In another aspect, the aforementioned means may be a circuit or any apparatus configured to perform the functions recited by the aforementioned means.

In FIG. 11, a flow chart is provided, which illustrates an exemplary wireless communication device process for performing some aspects of the disclosure. As described below, some or all illustrated features may be omitted in a particular implementation within the scope of the present disclosure, and some illustrated features may not be required for implementation of all examples. In some examples, the process 1100 may be carried out by the wireless communication device 800 illustrated in FIG. 8. In some examples, the process 1100 may be carried out by any suitable apparatus or means for carrying out the functions or algorithm described below.

Process 1100 begins at block 1110 with the wireless communication device 800 determining that a type associated with a sidelink communication is a PSFCH communication. For example, the determining circuitry 840 shown and described above in connection with FIG. 8 may provide a means for determining that the type associated with the sidelink communication is the PSFCH communication.

At block 1120, process 1100 continues with the wireless communication device 800 selecting a seed based on a pre-configuration of the seed according to a corresponding resource pool. For example, the initializing circuitry 842 shown and described above in connection with FIG. 8 may provide a means for selecting the seed.

At block 1130, process 1100 further continues with the wireless communication device 800 initializing a sequence generator with the seed in which the seed is based on the type associated with the sidelink communication. For example, the initializing circuitry 842 shown and described above in connection with FIG. 8 may provide a means for initializing the sequence generator.

Process 1100 then concludes block 1140 where the wireless communication device 800 utilizes the sequence generator to facilitate transmitting at least a portion of the sidelink communication including the PSFCH communication. For example, the transmitting circuitry 844 shown and described above in connection with FIG. 8 may provide a means for utilizing the sequence generator to facilitate transmitting the at least the portion of the sidelink communication including the PSFCH communication.

In one configuration, the wireless communication device 800 includes means for determining that a type associated with a sidelink communication is a PSFCH communication, means for selecting a seed based on a pre-configuration of the seed according to a corresponding resource pool, means for initializing a sequence generator with the seed in which the seed is based on the type associated with the sidelink communication, and means for utilizing the sequence generator to facilitate transmitting at least a portion of the sidelink communication including the PSFCH communication. In one aspect, the aforementioned means may be the processor 804 shown in FIG. 8 configured to perform the functions recited by the aforementioned means. In another aspect, the aforementioned means may be a circuit or any apparatus configured to perform the functions recited by the aforementioned means.

Of course, in the above examples, the circuitry included in the processor 804 is merely provided as an example, and other means for carrying out the described functions may be included within various aspects of the present disclosure, including but not limited to the instructions stored in the computer-readable storage medium 806, or any other suitable apparatus or means described in any one of the FIGS. 1-4 and 7-8, and utilizing, for example, the processes and/or algorithms described herein in relation to FIGS. 9-11.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-11 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-4, 7, and/or 8 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication, comprising:
   determining a type associated with a sidelink communication;
   initializing a sequence generator with a seed, wherein the seed is determined based on the type associated with the sidelink communication, out of a plurality of seeds that are respectively based on a plurality of types of sidelink communication, the plurality of types of sidelink communication including a second stage sidelink control information (SCI) communication, a Phase-tracking Reference Signal (PTRS) communication, and a Physical Sidelink Feedback Channel (PSFCH) communication; and
   utilizing the sequence generator to facilitate transmitting at least a portion of the sidelink communication.

2. The method of claim 1, wherein the type associated with the sidelink communication is the second stage SCI communication.

3. The method of claim 2, wherein the utilizing comprises utilizing the sequence generator to scramble coded bits of the second stage SCI communication.

4. The method of claim 2, wherein the initializing comprises selecting the seed based on a pre-configuration of the seed according to a corresponding resource pool.

5. The method of claim 1, wherein the type associated with the sidelink communication is the PTRS communication, and wherein the utilizing comprises utilizing the sequence generator to transmit the PTRS communication.

6. The method of claim 5, wherein the initializing comprises selecting the seed based on a pre-configuration of the seed according to a corresponding resource pool.

7. The method of claim 5, wherein the initializing comprises calculating the seed from a cyclic redundancy check (CRC) of a corresponding first stage sidelink control information (SCI) communication.

8. The method of claim 5, wherein the initializing comprises calculating the seed from a cyclic redundancy check (CRC) of a corresponding second stage sidelink control information (SCI) communication.

9. The method of claim 5, wherein the initializing comprises calculating the seed from a source identifier associated with the PTRS communication.

10. The method of claim 5, wherein the initializing comprises calculating the seed from a destination identifier associated with the PTRS communication.

11. The method of claim 1, wherein the type associated with the sidelink communication is a Physical Sidelink Feedback Channel (PSFCH) communication.

12. The method of claim 11, wherein the initializing comprises selecting the seed based on a pre-configuration of the seed according to a corresponding resource pool.

13. A wireless communication device comprising:
    a transceiver;
    a memory; and
    at least one processor coupled to the transceiver and the memory, wherein the at least one processor and memory are configured to:
        determine a type associated with a sidelink communication;
        initialize a sequence generator with a seed, wherein the seed is determined based on the type associated with the sidelink communication, out of a plurality of seeds that are respectively based on a plurality of types of sidelink communication, the plurality of types of sidelink communication including a second stage sidelink control information (SCI) communication, a Phase-tracking Reference Signal (PTRS) communication, and a Physical Sidelink Feedback Channel (PSFCH) communication; and
        utilize the sequence generator to facilitate transmitting at least a portion of the sidelink communication.

14. The wireless communication device of claim 13, wherein the type associated with the sidelink communication is the PTRS communication, and wherein the utilizing comprises utilizing the sequence generator to transmit the PTRS communication.

15. The wireless communication device of claim 14, wherein the at least one processor configured to initialize the sequence generator with the seed is configured to calculate the seed from a cyclic redundancy check (CRC) of a corresponding first stage sidelink control information (SCI) communication.

16. The method of claim 13, wherein the type associated with the sidelink communication is the PSFCH communication.

17. The method of claim 16, wherein the at least one processor configured to initialize the sequence generator with the seed is configured to select the seed based on a pre-configuration of the seed according to a corresponding resource pool.

18. The wireless communication device of claim 13, wherein the type associated with the sidelink communication is the second stage SCI communication.

19. The wireless communication device of claim 18, wherein the at least one processor configured to utilize the sequence generator is configured to utilize the sequence generator to scramble coded bits of the second stage SCI communication.

20. The wireless communication device of claim 18, wherein the at least one processor configured to initialize the sequence generator is configured to select the seed based on a pre-configuration of the seed according to a corresponding resource pool.

21. An apparatus for wireless communication comprising:
  means for determining a type associated with a sidelink communication;
  means for initializing a sequence generator with a seed, wherein the seed is determined based on the type associated with the sidelink communication, out of a plurality of seeds that are respectively based on a plurality of types of sidelink communication, the plurality of types of sidelink communication including a second stage sidelink control information (SCI) communication, a Phase-tracking Reference Signal (PTRS) communication, and a Physical Sidelink Feedback Channel (PSFCH) communication; and
  means for utilizing the sequence generator to facilitate transmitting at least a portion of the sidelink communication.

22. The apparatus of claim 21, wherein the type associated with the sidelink communication is the PTRS communication, and wherein the means for utilizing is configured to utilize the sequence generator to transmit the PTRS communication.

23. The apparatus of claim 22, wherein the means for initializing is configured to calculate the seed from a cyclic redundancy check (CRC) of a corresponding first stage sidelink control information (SCI) communication.

24. The apparatus of claim 21, wherein the type associated with the sidelink communication is the PSFCH communication, and
  wherein the means for initializing is configured to select the seed based on a pre-configuration of the seed according to a corresponding resource pool.

25. The apparatus of claim 21, wherein the type associated with the sidelink communication is the second stage SCI communication.

26. The apparatus of claim 25, wherein the means for utilizing the sequence generator is configured to utilize the sequence generator to scramble coded bits of the second stage SCI communication.

27. The apparatus of claim 25, wherein the means for initializing is configured to select the seed based on a pre-configuration of the seed according to a corresponding resource pool.

* * * * *